United States Patent
Lee et al.

(10) Patent No.: US 11,882,272 B2
(45) Date of Patent: Jan. 23, 2024

(54) IMAGE ENCODING/DECODING METHOD AND DEVICE, AND RECORDING MEDIUM IN WHICH BITSTREAM IS STORED

(71) Applicant: Electronics and Telecommunications Research Institute, Daejeon (KR)

(72) Inventors: Jin Ho Lee, Daejeon (KR); Sung Chang Lim, Daejeon (KR); Jung Won Kang, Daejeon (KR); Hyun Suk Ko, Daejeon (KR); Dong San Jun, Daejeon (KR); Ha Hyun Lee, Seoul (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/744,845

(22) Filed: May 16, 2022

(65) Prior Publication Data
US 2022/0279171 A1 Sep. 1, 2022

Related U.S. Application Data

(63) Continuation of application No. 16/302,462, filed as application No. PCT/KR2017/007656 on Jul. 17, 2017, now Pat. No. 11,368,681.

(30) Foreign Application Priority Data

Jul. 18, 2016 (KR) .................. 10-2016-0091008

(51) Int. Cl.
*H04N 19/107* (2014.01)
*H04N 19/176* (2014.01)
(Continued)

(52) U.S. Cl.
CPC ......... *H04N 19/107* (2014.11); *H04N 19/105* (2014.11); *H04N 19/11* (2014.11);
(Continued)

(58) Field of Classification Search
CPC .... H04N 19/107; H04N 19/105; H04N 19/11; H04N 19/117; H04N 19/119;
(Continued)

(56) References Cited

U.S. PATENT DOCUMENTS

2013/0070848 A1* 3/2013 Guo ............... H04N 19/176
375/E7.243
2014/0314143 A1* 10/2014 Lee ............... H04N 19/105
375/240.02
(Continued)

FOREIGN PATENT DOCUMENTS

| CN | 103238333 A | 8/2013 |
|---|---|---|
| CN | 104137549 A | 11/2014 |

(Continued)

OTHER PUBLICATIONS

Sector, Standardization, and of ITU. "Series H: Audiovisual and Multimedia Systems Infrastructure of audiovisual services—Coding of moving video." H. 265 Oct. 2014.
(Continued)

*Primary Examiner* — Hesham K Abouzahra
(74) *Attorney, Agent, or Firm* — NSIP Law

(57) ABSTRACT

The present invention relates to an image encoding/decoding method and apparatus. An image decoding method performing intra prediction according to the present invention may comprise dividing a current block into at least one sub-block; deriving an intra prediction mode for the at least one sub-block; constructing a reference sample for the intra prediction; and performing intra prediction for the at least one sub-block based on the derived intra prediction mode.

9 Claims, 17 Drawing Sheets

(51) Int. Cl.
| | |
|---|---|
| *H04N 19/117* | (2014.01) |
| *H04N 19/147* | (2014.01) |
| *H04N 19/119* | (2014.01) |
| *H04N 19/11* | (2014.01) |
| *H04N 19/105* | (2014.01) |
| *H04N 19/30* | (2014.01) |
| *H04N 19/91* | (2014.01) |
| *H04N 19/146* | (2014.01) |
| *H04N 19/44* | (2014.01) |
| *H04N 19/126* | (2014.01) |
| *H04N 19/52* | (2014.01) |

(52) U.S. Cl.
CPC ......... *H04N 19/117* (2014.11); *H04N 19/119* (2014.11); *H04N 19/126* (2014.11); *H04N 19/146* (2014.11); *H04N 19/147* (2014.11); *H04N 19/176* (2014.11); *H04N 19/30* (2014.11); *H04N 19/44* (2014.11); *H04N 19/52* (2014.11); *H04N 19/91* (2014.11)

(58) Field of Classification Search
CPC ............... H04N 19/126; H04N 19/146; H04N 19/147; H04N 19/176; H04N 19/30; H04N 19/44; H04N 19/52; H04N 19/91
See application file for complete search history.

(56) References Cited

U.S. PATENT DOCUMENTS

| | | | |
|---|---|---|---|
| 2015/0063452 A1 | 3/2015 | Kim et al. | |
| 2016/0182905 A1 | 6/2016 | Lee et al. | |
| 2017/0150186 A1* | 5/2017 | Zhang | .................. H04N 19/625 |
| 2017/0339404 A1 | 11/2017 | Panusopone et al. | |
| 2019/0313116 A1 | 10/2019 | Lee | |

FOREIGN PATENT DOCUMENTS

| | | |
|---|---|---|
| JP | 2013-141187 A | 7/2013 |
| KR | 10-1996-0013055 A | 4/1996 |
| KR | 10-2008-0067363 A | 7/2008 |
| KR | 10-2010-0109187 A | 10/2010 |
| KR | 10-2012-0129944 A | 11/2012 |
| KR | 10-2014-0121918 A | 10/2014 |
| KR | 10-1526778 B1 | 6/2015 |
| KR | 10-1600720 B1 | 3/2016 |
| KR | 10-2016-0051343 A | 5/2016 |
| KR | 10-2016-0053848 A | 5/2016 |
| WO | WO 2012/045886 A1 | 4/2012 |
| WO | WO 2012-170812 A1 | 12/2012 |
| WO | WO 2016/056772 A1 | 4/2016 |

OTHER PUBLICATIONS

Chen, Jianle et al., "Algorithm Description of Joint Exploration Test Model 3", *Joint Video Exploration Team (JVET) of ITU-T SG 16 WP 3 and ISO/IEC JTC 1/SC 29/WG 11*, 3rd Meeting: Geneva Switzerland, May 26-Jun. 1, 2016 (pp. 1-8).

Li, Jiahao et al., "Multiple line-based intra prediction", *Joint Video Exploration Team (JVET) of ITU-T SG 16 WP 3 and ISO/IEC JTC 1/SC 29/WG 11*, 3rd Meeting: Geneva Switzerland, May 26-Jun. 1, 2016 (pp. 1-7).

Seregin, Vadim et al. "Neighbor based intra most probable modes list derivation" *Joint Video Exploration Team (JVET) of ITU-T SG 16 WP 3 and ISO/IEC JTC 1/SC 29/WG 11*, 3rd Meeting: Geneva Switzerland, May 26-Jun. 1, 2016 (pp. 1-5).

Chang, Yao-Jen, et al., "EE6: Arbitrary Reference Tier for Intra Directional Modes, with Supplementary Results", *Joint Video Exploration Team (JVET) of ITU-T SG 16 WP 3 and ISO/IEC JTC 1/SC 29/WG 11*, 4th Meeting, Chengdu, People's Republic of China, Oct. 15-21, 2016 (pp. 1-7).

International Search Report dated Oct. 24, 2017 in corresponding International Patent Application No. PCT/KR2017/007656 (2 pages in English and 2 pages in Korean).

Panusopone, Krit, et al. "Efficient Transform Unit Representation" JCTVC-D250 r2, Joint Collaborative Team on Videos Coding of ITU-T SG16 WP3 and ISO/IEC JTC1/SC29/WG11., 4th Meeting: Daegu, KR, Jan. 20-28, 2011, (3 pages in English).

Cao, Xiaoran, et al. "CE6.c Report on Simplification of Short Distance Intra Prediction Method" Document: JCTVC-G556_r2, Joint Collaborative Team on Video Coding (JCT-VC) of ITU-T SG16 WP3 and ISO/IEC JTC1/SC29/WG11, 7th Meeting: Geneva, Nov. 21-30, 2011, (2 pages in Japanese, 21 pages in English).

* cited by examiner

FIG. 7

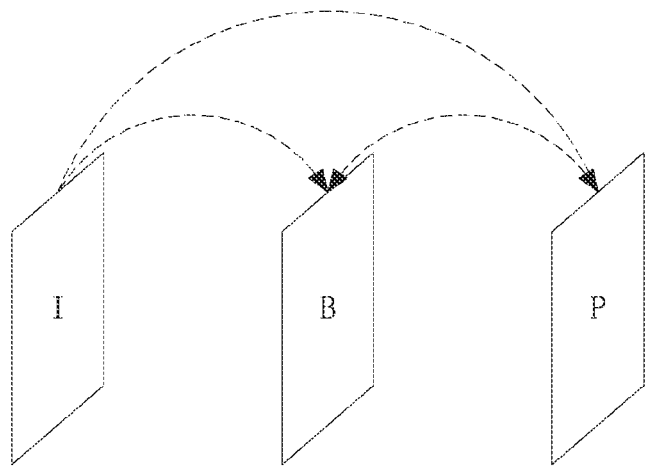

FIG. 8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

FIG. 9

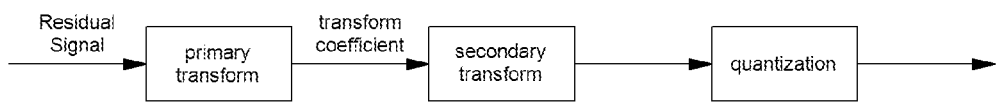

Diagonal    Horizontal    Vertical

FIG. 15

| | | c | f | |
|---|---|---|---|---|
| a | b | | | h |
| | | d | e | g | |

| | | C1 | C2 | C3 | C4 |
|---|---|---|---|---|---|
| i | j | C5 | C6 | C7 | C8 | ← Current Block
| k | | C9 | C10 | C11 | C12 | ← Sub-block
| l | | C13 | C14 | C15 | C16 | m

FIG. 16

| | | c | f | |
|---|---|---|---|---|
| a | b | | | h |
| | | d | e | g | |

| i | j | C1 | C2 | C3 | ← Current Block |
| k | | C4 | C5 | C8 | C9 | ← Sub-block |
| l | | C6 | C7 | C10 | | m

FIG. 17

|   | 50 | 0 | 58 |
|---|---|---|---|
| 30 | C1=40 | C2=45 | C3=45 | C4=52 |
| 18 | C5=29 | C6=37 | C7=41 | C8=47 |
| 16 | C9=23 | C10=30 | C11=36 | C12=42 |
| 1 | C13=23 | C14=27 | C15=32 | C16=37 |

← Current Block
← Sub-block

FIG. 18

|   | 50 | 64 | 0 |
|---|---|---|---|
| 30 | C1=46 | C2=50 | C3=55 |
| 18 | C4=42 | C5=49 / C6=49 | C7=52 | C8=53 |
| 16 | C9=40 / C10=40 / C11=46 | C12=48 | C13=50 | C14=51 |
| 1 | | | | |

← Current Block
← Sub-block (a)     (b)     (c)     (d)

FIG. 22

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| | Directional Intra Prediction Mode | | | | | | | | | | | | | | | | |
| intraPredAngle | – | 32 | 26 | 21 | 17 | 13 | 9 | 5 | 2 | 0 | -2 | -5 | -9 | -13 | -17 | -21 | -26 |
| predModeIntra | 18 | 19 | 20 | 21 | 22 | 23 | 24 | 25 | 26 | 27 | 28 | 29 | 30 | 31 | 32 | 33 | 34 |
| | Directional Intra Prediction Mode | | | | | | | | | | | | | | | | |
| intraPredAngle | -32 | -26 | -21 | -17 | -13 | -9 | -5 | -2 | 0 | 2 | 5 | 9 | 13 | 17 | 21 | 26 | 32 |
| predModeIntra | 35 (Upper Right → Lower Left) | | 36 (Upper Left → Lower Right type-1) | | 37 (Lower Left → Upper Right) | | 38 (Upper Left → Lower Right type-2) | | | | N | | | | | | |
| | Sample-wise Directional Intra Prediction Mode | | | | | | | | | | | | | | | | |
| Parameters | cuv1, cw1[i] where i = 0, ...,$N_s$-1 | | cuv2, cw2[i] where i = 0, ...,$N_s$-1 | | cuv3, cw3[i] where i = 0, ...,$N_s$-1 | | cuv4, cw4[i] where i = 0, ...,$N_s$-1 | | | | cuvN, cwN[i] where i = 0,...,$N_s$-1 | | | | | | |

FIG. 25
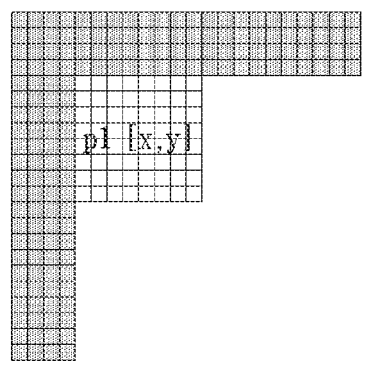
(a)
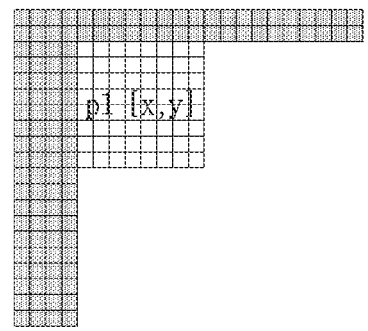
(b)
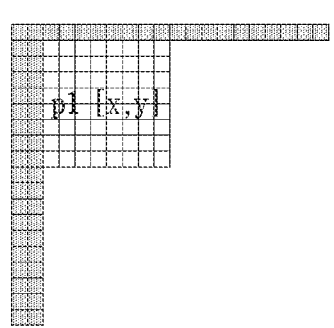
(c)
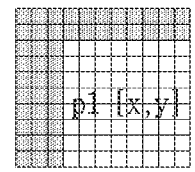
(d)

IMAGE ENCODING/DECODING METHOD AND DEVICE, AND RECORDING MEDIUM IN WHICH BITSTREAM IS STORED

CROSS-REFERENCE TO RELATED APPLICATIONS

This application is a continuation of application Ser. No. 16/302,462 having a 371(c) date of Nov. 16, 2018, which is a U.S. national stage application of International Application No. PCT/KR2017/007656 filed on Jul. 17, 2017, which claims the benefit of Korean Patent Application No. 10-2016-0091008 filed on Jul. 18, 2016 in the Korean Intellectual Property Office, the entire disclosures of which are incorporated by reference for all purposes.

TECHNICAL FIELD

The present invention relates to a method and apparatus for encoding/decoding an image. Particularly, the present invention relates to a method and apparatus for encoding/decoding an image using intra prediction and a recording medium storing a bitstream generated by an image encoding method/apparatus of the present invention.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

DISCLOSURE

Technical Problem

An object of the present invention is to provide a method and apparatus for encoding and decoding a video image to enhance compression efficiency.

Another object of the present invention is to provide a method and apparatus for encoding and decoding a video image using intra prediction to enhance compression and to provide a recording medium storing a bitstream generated by an image encoding method/apparatus of the present invention.

Technical Solution

An image decoding method for performing intra prediction according to the present invention may comprise dividing a current block into at least one sub-block; deriving an intra prediction mode for the at least one sub-block; constructing a reference sample for the intra prediction; and performing intra prediction for the at least one sub-block based on the derived intra prediction mode.

In the method for decoding an image according to the present invention, if a size of the current block corresponds to a predetermined size, the dividing may be performed.

In the method for decoding an image according to the present invention, if a horizontal or vertical length of the current block is a dividable length, the division may be performed.

In the method for decoding an image according to the present invention, the at least one sub-block may have a predetermined size or shape.

In the method for decoding an image according to the present invention, the division may be performed based on division information about the current block.

In the method for decoding an image according to the present invention, the derivation of an intra prediction mode for the at least one sub-block may be performed based on at least one of an intra prediction mode of the current block and an intra prediction mode of at least one neighbor block.

In the method for decoding an image according to the present invention, the intra prediction mode for the sub-block may be derived as a statistic value of the intra prediction mode of the at least one neighbor block, and the statistic value may be at least one of a minimum value, a maximum value, a most frequent value, a median value, a mean value, and a weighted mean.

In the method for decoding an image according to the present invention, the intra prediction mode for the sub-block may derived based on a size of the at least one neighbor block.

In the method for decoding an image according to the present invention, the intra prediction mode for the sub-block may be derived based on a directionality of the intra prediction mode of the at least one neighbor block.

In the method for decoding an image according to the present invention, the intra prediction mode of the current block may be derived using Most Probable Mode (MPM), and the intra prediction mode for the sub-block may be derived based on a result of a comparison between the intra prediction mode of the at least one neighbor block and the intra prediction mode of the current block.

In the method for decoding an image according to the present invention, the construction of a reference sample may be performed using at least one reconstructed sample line.

In the method for decoding an image according to the present invention, the construction of a reference sample may be performed by calculating a weighted mean of at least one reconstructed sample included in the at least one reconstructed sample line.

In the method for decoding an image according to the present invention, a weight used for calculating the weighted mean may be determined based on a distance from the current block.

In the method for decoding an image according to the present invention, the weight used for calculating the weighted mean may get bigger as the distance from the current block gets smaller.

In the method for decoding an image according to the present invention, a number of the at least one reconstructed sample line may be determined based on at least one of a size, a shape, and the intra prediction mode of the current block.

An image encoding method for performing intra prediction according to the present invention may comprises dividing a current block into at least one sub-block; determining an intra prediction mode for the at least one sub-block; constructing a reference sample for the intra prediction; and performing intra prediction for the at least one sub-block based on the determined intra prediction mode.

A recording medium storing a bitstream generated by an image encoding method for performing intra prediction may store a bitstream generated by an image encoding method which comprises dividing a current block into at least one sub-block; determining an intra prediction mode for the at least one sub-block; constructing a reference sample for the intra prediction; and performing intra prediction for the at least one sub-block based on the determined intra prediction mode.

An image decoding apparatus for performing intra prediction may comprises an intra prediction unit which performs division of a current block into at least one sub-block, derivation of an intra prediction mode for the at least one sub-block, construction of a reference sample for the intra prediction, and performing of intra prediction for the at least one sub-block based on the derived intra prediction mode.

An image encoding apparatus for performing intra prediction may comprises an intra prediction unit which performs division of a current block into at least one sub-block, determination of an intra prediction mode for the at least one sub-block, construction of a reference sample for the intra prediction, and performing of intra prediction for the at least one sub-block based on the determined intra prediction mode.

Advantageous Effects

According to the present invention, an image encoding/decoding method and apparatus of improved compression efficiency may be provided.

According to the present invention, an image encoding/decoding method and apparatus using intra prediction of improved compression efficiency and a recording medium storing a bitstream generated by an image encoding method/apparatus of the present invention may be provided.

DESCRIPTION OF DRAWINGS

FIG. 7 is a view for explaining an embodiment of a process of inter prediction.

FIG. 8 is a view for explaining transform sets according to intra-prediction modes.

FIG. 9 is a view for explaining a process of transform.

FIG. 15 is a view depicting an embodiment of dividing a current block into sub-blocks.

FIG. 16 is a view depicting another embodiment of dividing a current block into sub-blocks.

FIG. 17 is a view depicting another embodiment of dividing a current block into sub-blocks.

FIG. 18 is a view depicting another embodiment of dividing a current block into sub-blocks.

FIG. 22 is a view depicting directional intra prediction modes and sample-wise directional intra prediction modes.

FIG. 25 is a view depicting an embodiment of reconstructing a corresponding block using an upper and/or left reference sample line.

FIG. 26 is a view depicting an embodiment of a reconstructed first color component corresponding block, in the case where a second color component prediction target block is of size 4×4.

FIG. 27 is an exemplary view depicting samples of a first color component, and samples of a second color component.

MODE FOR CARRYING OUT THE INVENTION

Figure 1:
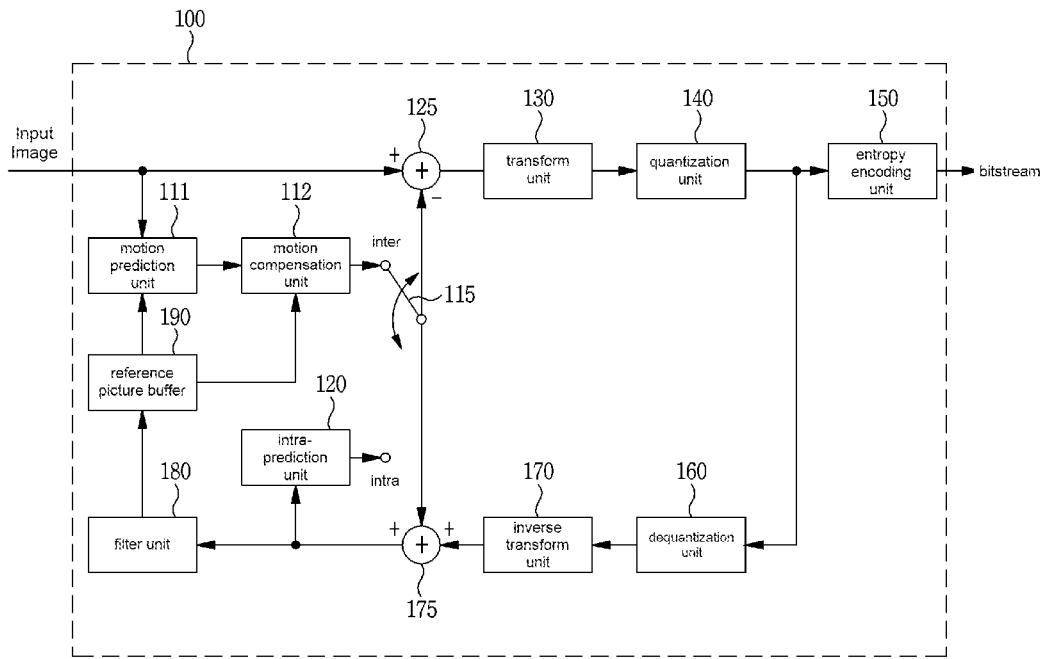
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an M×N matrix. Here, M and N are positive integers, and the block may mean a sample matrix in a two-dimensional form.

Sample: is a basic unit of a block, and may indicate a value ranging 0 to $2^{Bd}31$ 1 depending on the bit depth (Bd). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate: may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may be mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
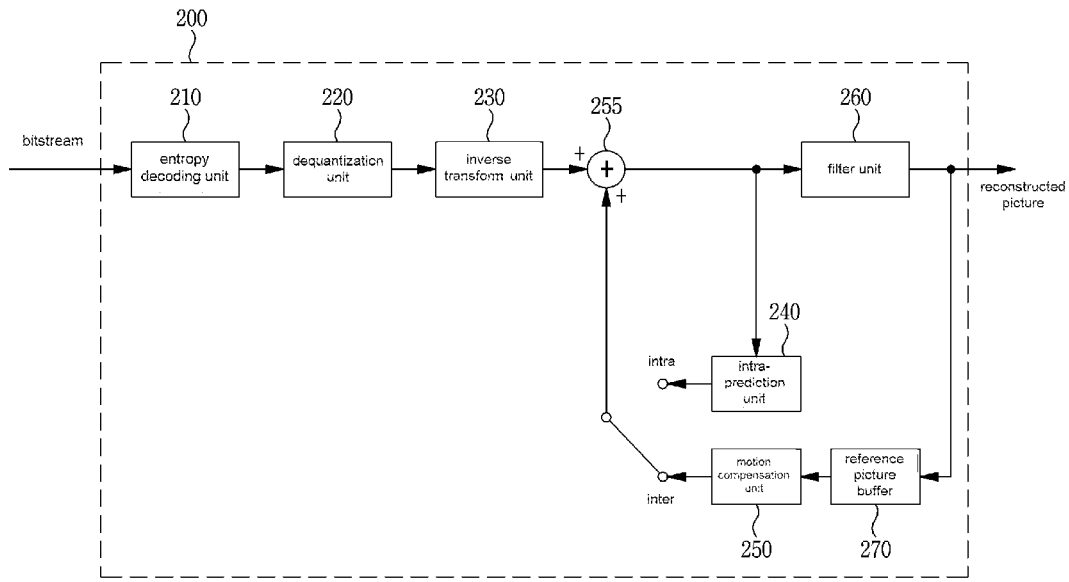
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning. According to the size of the transform unit and the intra-prediction mode, instead of up-right scanning, it is possible to use vertical direction scanning and horizontal direction scanning. That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block encoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture. Here, signaling a flag or an index may mean that the encoder entropy encodes the corresponding flag or index and includes into a bitstream, and that the decoder entropy decodes the corresponding flag or index from the bitstream.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
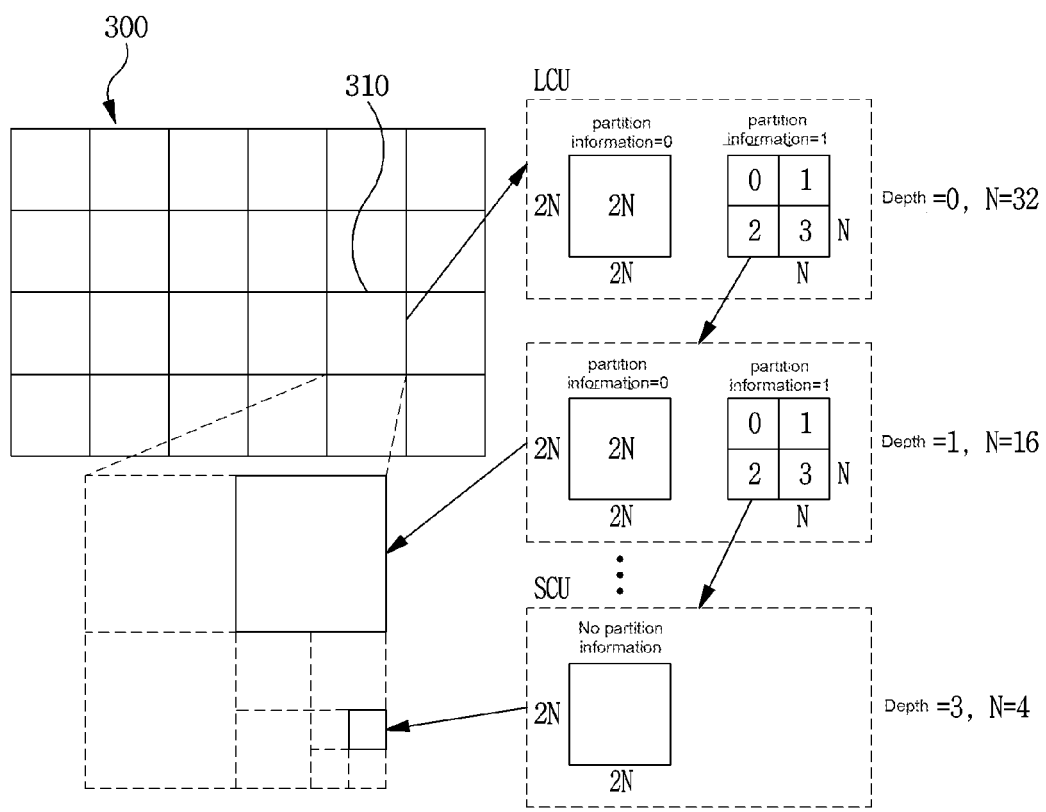
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
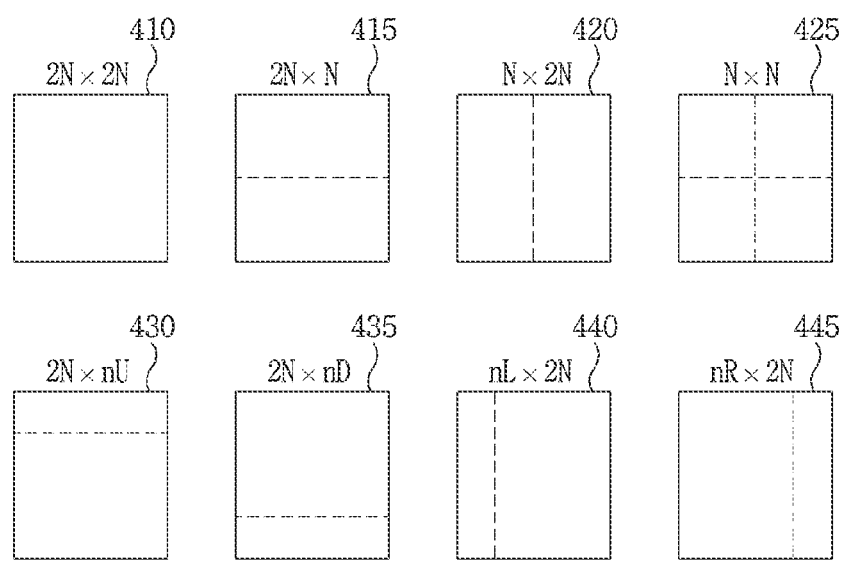
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
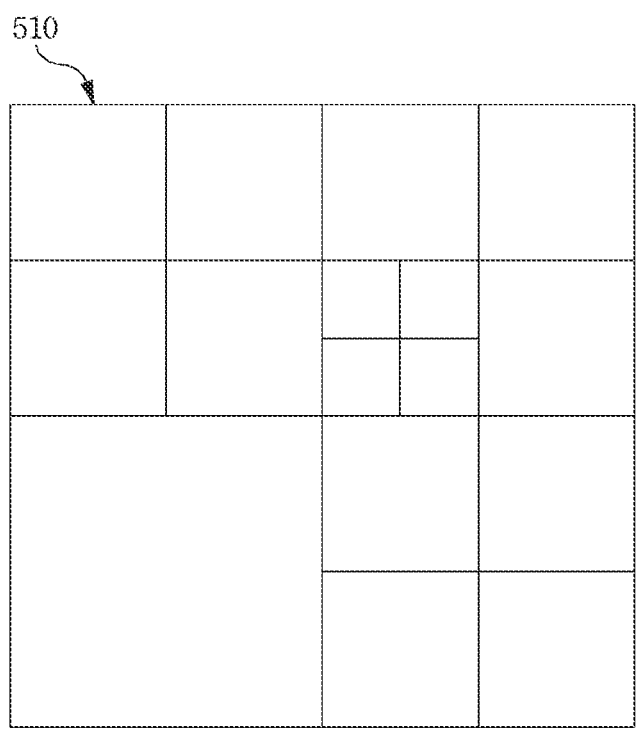
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
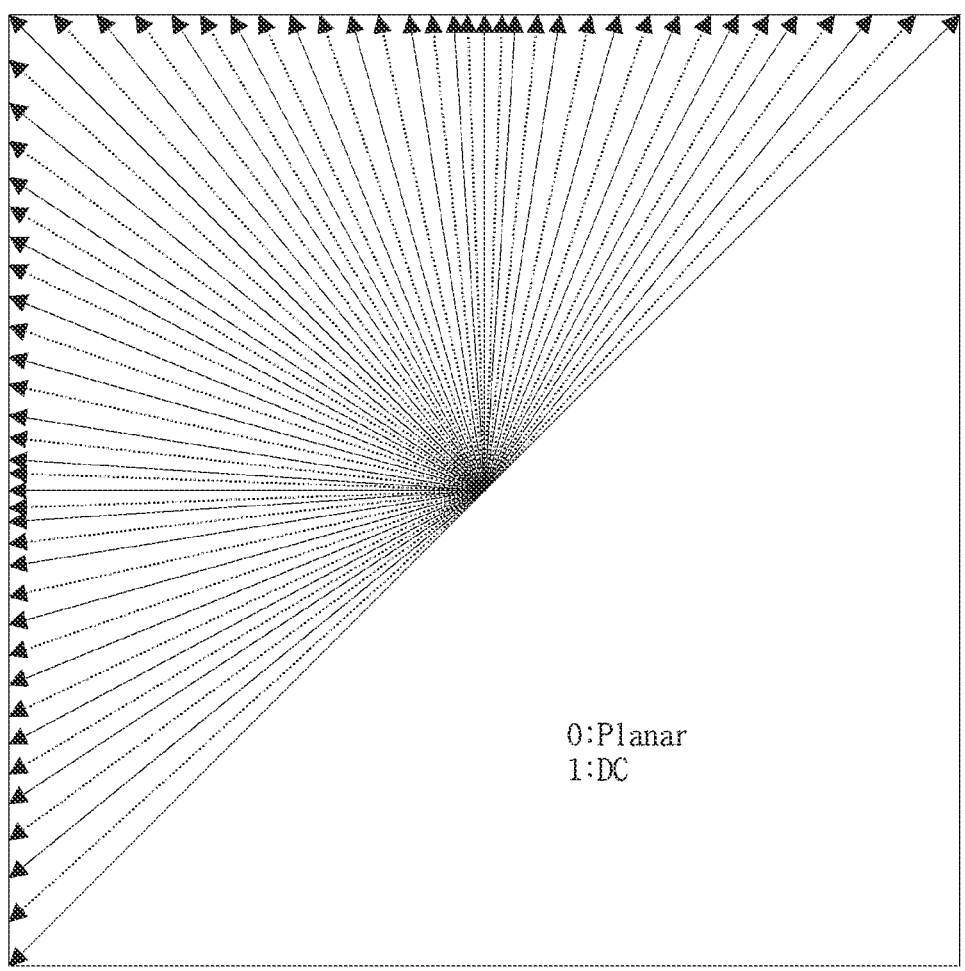
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCT-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
| --- | --- |
| 0 | DST_VII, DCT-VIII |
| 1 | DST-VII, DST-I |
| 2 | DST-VII, DCT-V |

TABLE 2

| Transform set | Transform |
| --- | --- |
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, entropy encoding/decoding indicating which transform is used among transforms of the transform set may be performed. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be transmitted or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be transmitted, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

Figure 10:
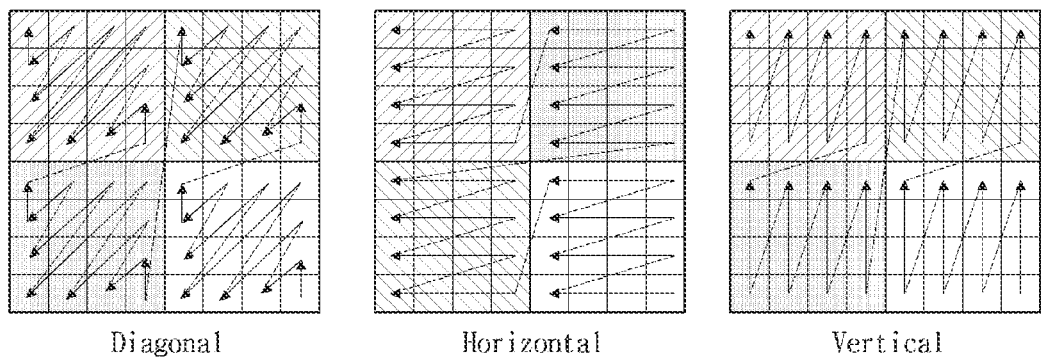
FIG. 10 is a view for explaining scanning of quantized transform coefficients.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized transform coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
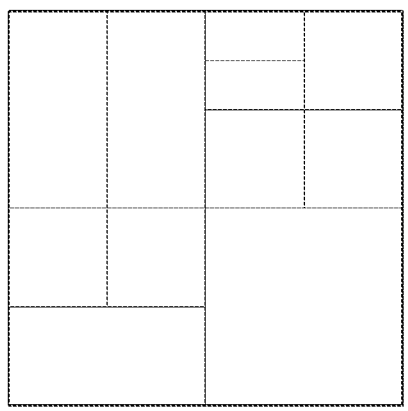
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

TABLE 3

| quadtree_flag | 1 | 0 | | | 1 | 0 | | | 0 | 0 | 0 | 0 | | | | | 0 | |
|---|---|---|---|---|---|---|---|---|---|---|---|---|---|---|---|---|---|---|
| binarytree_flag | | | 1 | 0 | 0 | | 1 | 0 | 0 | 0 | 0 | 0 | 1 | 1 | 0 | 0 | 0 | 0 |
| Btype_flag | | | | 1 | | | | 0 | | | | | | 0 | 1 | | | |

For example, partition information for FIG. 11 may be derived by signaling at least one of split_flag, QB_flag, and Btype_flag as shown in table 4.

TABLE 4

| split_flag | 1 | 1 | | 0 | 0 | 1 | | 1 | | 0 | 0 | 0 | 0 | 0 | 1 | | 1 | 0 | 0 | 0 | 0 |
|---|---|---|---|---|---|---|---|---|---|---|---|---|---|---|---|---|---|---|---|---|---|
| QB_flag | | 0 | 1 | | | 0 | | 1 | | | | | | | 1 | | | | | | |
| Btype_flag | | | | 1 | | | | 0 | | | | | | | | 0 | 1 | | | | |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

When the size of a block is in a predetermined range, partitioning may be performed only in a quad tree form. Here, the predetermined range may be defined as at least one of the size of a maximum block or the size of a minimum block that can be partitioned only in a quad tree form. Information indicating the size of a maximum/minimum block where a partition in the quad tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

Figure 12:
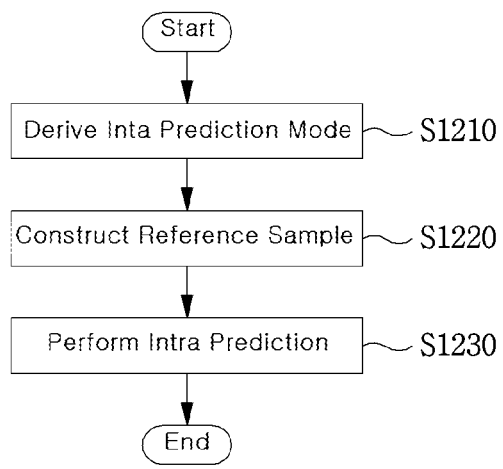
FIG. 12 is a view depicting a method for performing intra prediction on a current block according to an embodiment of the present invention.

FIG. 12 is a view depicting a method for performing intra prediction on a current block according to an embodiment of the present invention.

As illustrated in FIG. 12, intra prediction may include deriving an intra prediction mode (S1210), constructing a reference sample (S1220), and/or performing intra prediction (S1230).

In the step of deriving an intra prediction mode (S1210), an intra prediction mode of a neighbor block may be used, an intra prediction mode of a current block may be decoded (e.g., entropy-decoded) from a bitstream, and/or the intra prediction mode of the current block may be derived using a coding parameter of a neighbor block. Or, in the step of deriving an intra prediction mode (S1210), the intra prediction mode of the current block may be derived, using an intra prediction mode of a neighbor block, a combination of one or more intra prediction modes of neighbor blocks, and/or an intra prediction mode derived by MPM.

In the step of constructing a reference sample (S1220), a reference sample may be constructed by performing reference sample selection and/or reference sample filtering.

In the step of performing intra prediction (S1230), intra prediction may be performed for the current block, using non-directional prediction, directional prediction, location information-based prediction, and/or luma/chroma signal-based prediction. In the step of performing intra prediction (S1230), filtering may be additionally performed on a prediction sample. If directional prediction is performed, different directional predictions may be performed according to one or more sample units. For example, the one or more sample units may be a single sample, a sample group, a line, and/or a sub-block.

Hereinbelow, the step of deriving an intra prediction mode (S1210) will be described in greater detail.

As described before, to derive the intra prediction mode of the current block, at least one of a method for using intra prediction modes of one or more neighbor blocks, a method for decoding an intra prediction mode of a current block from a bitstream, and a method for using a coding parameter of a neighbor block may be used. A neighbor block(s) may be one or more blocks reconstructed before encoding/decoding of the current block.

If the neighbor block is located outside the boundary of at least one predetermined unit such as a picture, a slice, a tile, and a Coding Tree Unit (CTU), or a PCM mode or inter prediction has been applied to the neighbor block, it may be determined that the neighbor block is unavailable. An intra prediction mode corresponding to the unavailable neighbor block may be replaced with a DC mode, a Planar mode, or a predetermined intra prediction mode.

The current block maybe of size W×H where W and H are positive integers and may be equal or different. W and/or H may be at least one of, for example, 2, 4, 8, 16, 32, 64, 128, 256, and 512.

Figure 13:
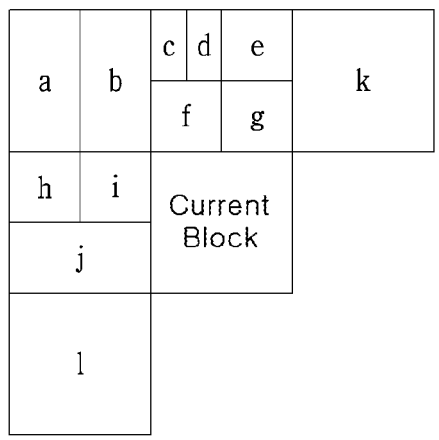
FIG. 13 is a view depicting a method for deriving an intra prediction mode of a current block from a neighbor block.

FIG. 13 is a view depicting a method for deriving an intra prediction mode of a current block from a neighbor block.

In FIG. 13, a to k marked on neighbor blocks may denote intra prediction modes of the neighbor blocks or mode numbers. The position of a neighbor block used to derive the intra prediction mode of the current block may be a predefined fixed position. Or information about the position of the neighbor block may be derived by encoding/decoding. In the present disclosure, encoding/decoding may be used to include entropy encoding and decoding.

In the case where an intra prediction mode of a neighbor block is used, a specific mode of a neighbor block may be derived as the intra prediction mode of the current block. For example, intra prediction mode i of a neighbor block to which a left sample (−1, 0) adjacent to a sample (0, 0) of the current block belongs may be derived as the intra prediction mode of the current block. Or, intra prediction mode f of a neighbor block to which an upper sample (0, −1) adjacent to the sample (0, 0) of the current block belongs may be derived as the intra prediction mode of the current block. Or, intra prediction mode b of a neighbor block to which a left uppermost sample (−1, −1) adjacent to the sample (0, 0) of the current block belongs may be derived as the intra prediction mode of the current block. Or, intra prediction mode g of a neighbor block to which an upper sample (W−1, −1) adjacent to a sample (W−1, 0) of the current block belongs may be derived as the intra prediction mode of the current block. Or, intra prediction mode k of a neighbor block to which a right uppermost sample [W, −1] adjacent to the sample (W−1, 0) of the current block belongs may be derived as the intra prediction mode of the current block. Or, intra prediction mode j of a neighbor block to which a left sample (1, H−1) adjacent to a sample (0, H−1) of the current block belongs may be derived as the intra prediction mode of the current block. Or, intra prediction mode I of a neighbor block to which a left lowermost sample (−1, H) adjacent to the sample (0, H−1) of the current block belongs may be derived as the intra prediction mode of the current block. Or the intra prediction mode of a neighbor block at a predetermined position among the neighbor blocks may be derived as the intra prediction mode of the current block. For example, the predetermined position may be encoded/decoded from a bitstream or may be derived based on a coding parameter. For example, the predetermined position may be a block with intra prediction mode e.

Or one or more of the neighbor blocks of the current block may be selected. The selection may be made based on information explicitly signaled by a bitstream. Or the selection may be made according to a criterion preset between an encoder and a decoder. The intra prediction mode of the current block may be derived from the intra prediction modes of the selected one or more neighbor blocks. For example, the intra prediction mode of the current block may be derived using a statistic value of the intra prediction modes of the selected neighbor blocks. For example, the statistic value may include a minimum value, a maximum value, a mean value, a weighted mean, a most frequent value, and/or a median value.

For example, a mode having the smaller or higher mode number between intra prediction modes i and f of the neighbor blocks to which the left and upper samples adjacent to the sample (0, 0) of the current block belong may be derived as the intra prediction mode of the current block. For example, if the intra prediction modes of the selected neighbor blocks are b, f, g, i, and j, a mode having the smallest of the mode numbers of the intra prediction modes may be derived as the intra prediction mode of the current block. For example, if the intra prediction modes of the selected neighbor blocks are i, b and f, a mode having the median value of the mode numbers of the intra prediction modes may be derived as the intra prediction mode of the current block. For example, the most frequent one of the intra prediction modes of the neighbor blocks adjacent to the current block may be derived as the intra prediction mode of the current block.

Or, the intra prediction mode of the current block may be derived by combining the intra prediction modes of one or more neighbor blocks. An intra prediction mode may be represented as at least one of a mode number, a mode value, and a mode angle. For example, the mean of one or more intra prediction modes of neighbor blocks may be derived as the intra prediction mode of the current block. The mean of two intra prediction modes may refer to at least one of a median number between two mode numbers, the median value of two mode values, and the median angle between two mode angles.

For example, a mode corresponding to the mean of the mode values of intra prediction modes i and f of the neighbor blocks to which the left and upper samples adjacent to the sample (0, 0) of the current block belong may be derived as the intra prediction of the current block. For example, the intra prediction mode of the current block, Pred_mode may be derived by at least one of methods (1), (2), and (3) described in [Equation 1].

Pred_mode=(i+f)>>1 (1)

Pred_mode=(i+f+1)>>1 (2)

Pred_mode=(i+f)/2 (3)   [Equation 1]

Or if intra prediction mode i of the neighbor block is a non-directional mode, the intra prediction mode of the current block may be derived as intra prediction mode i. Or, if intra prediction mode f of the neighbor block is a directional mode, the intra prediction mode of the current block may be derived as intra prediction mode f.

Or, the intra prediction mode of the current block may be derived as a mode corresponding to the mean of at least one of the mode values of intra prediction modes b, f, g, i, and j of the neighbor blocks. For example, the intra prediction mode of the current block, Pred_mode may be derived by at least one of methods (1), (2), (3), and (4) described in [Equation 2].

Pred_mode=(f+g+i+j+2)>>2 (1)

Pred_mode=(b+f+g+i+j)/5 (2)

Pred_mode=(i+f+k+l+2)>>2 (3)

Pred_mode=(b+f+k+i+l)/5 (4)   [Equation 2]

Or, a mode corresponding to the mean of available intra prediction modes of adjacent neighbor blocks may be derived as the intra prediction mode of the current block. For example, if a left neighbor block of the current block is located outside of the boundary of a picture a tile, a slice, and/or a CTU, or corresponds to at least one of a PCM mode or an inter prediction mode and thus is not available, a mode corresponding to a statistic value of the intra prediction modes (e.g., f and g) of upper neighbor blocks may be derived as the intra prediction mode of the current block.

For example, a weighted mean or weighted sum may be used as the statist value of the intra prediction modes of the neighbor blocks. Herein, weights may be assigned based on the directionalities of the intra prediction modes of the neighbor blocks. For example, modes to which relatively large weights are assigned may be predefined or signaled. For example, the modes to which relatively large weights are assigned may be at least one of a vertical directional mode, a horizontal directional mode, and a non-directional mode. The same weight or different weights may be assigned to these modes. For example, the weighted sum of intra prediction modes i and f may be derived as the intra prediction mode of the current block, Pred_mode by [Equation 3] below. In [Equation 3] below, mode f may be a mode to which a relatively large weight is assigned (e.g., a vertical directional mode).

Pred_mode=(i+3*f+2)>>2   [Equation 3]

Or, the weights to be used for the weighted sum may be determined based on the sizes of the neighbor blocks. For example, if the size of an upper block adjacent to the current block is larger than that of a left block adjacent to the current block, a larger weight may be assigned to the intra prediction mode of the upper adjacent block. Or, a larger weight may be assigned to the intra prediction mode of the smaller neighbor block.

Or, if one or more intra prediction modes of neighbor blocks are a non-directional mode, the non-directional mode may be derived as the intra prediction mode of the current block. Or, the intra prediction mode of the current block may be derived using the intra prediction modes of neighbor blocks except for the non-directional mode. If all of the intra prediction modes of the neighbor blocks are a non-directional mode, the intra prediction mode of the current block may be derived as at least one of the DC mode or the Planar mode.

Or, the intra prediction mode of the current block may be derived using Most Probable Mode (MPM) based on the intra prediction mode of a neighbor block. If MPM is used, one or more pieces of information about the intra prediction mode of the current block may be encoded/decoded.

If MPM is used, an MPM list may be configured. The MPM list may include an intra prediction mode derived based on the intra prediction mode of a neighbor block. The MPM list may include N candidate modes. N is a positive integer and may vary depending on the size and/or shape of the current block. Or, information about N may be signaled by a bitstream.

For example, the intra prediction mode of the current block derived using the one or more intra prediction modes of the neighbor blocks may be a candidate mode included in the MPM list.

In the example illustrated in FIG. 13, the intra prediction modes of the neighbor blocks at the same positions of (−1, H−1), (W−1, −1), (W, −1), (−1, H), and (−1, −1) adjacent to the current block may be used, for example, the MPM list may be made in the order of j, g, Planar, DC, l, k, and b. Or, the MPM list may be made in the order of i, f, Planar, DC, l, k, and b. A repeated mode may be included once in the MPM list. If the MPM list is not filled up due to the presence of repeated modes, an additional candidate mode may be included in the list based on the modes included in the list. For example, a mode corresponding to +N or −N (N is a positive integer, for example, 1) of a mode included in the list may be added to the list. Or, at least one of modes that are not included in the list, among a horizontal mode, a vertical mode, a 45-degree mode, a 135-degree mode, and a 225-degree mode, may be added to the list.

An indicator (e.g., prev_intra_luma_pred_flag) indicating whether the same mode as the intra prediction mode of the current block is present in the derived MPM list may be encoded in a bitstream or may be decoded from a bitstream.

If the indicator indicates the presence of the same mode as the intra prediction mode of the current block in the MPM list, index information (e.g., mpm_idx) indicating which mode it is among the modes included in the MPM list may be encoded in a bitstream or decoded from a bitstream. The intra prediction mode of the current block may be derived based on the decoded index information.

If the indicator indicates the absence of the same mode as the intra prediction mode of the current block in the MPM list, information about the intra prediction mode of the current block may be encoded in a bitstream or decoded from the bitstream. The intra prediction mode of the current block may be derived based on the decoded information about the intra prediction mode of the current block. Herein, intra prediction modes that are not included in the MPM list may be arranged in at least one of an ascending order or a descending order. Or one or more of the intra prediction modes that are not included in the MPM list may be grouped into one or more groups. For example, modes corresponding to +N or −N (N is a positive integer, for example, 1, 2 or 3) of the intra prediction modes included in the MPM list may be grouped into one group. Herein, the group may include a predetermined number of (e.g., 8 or 16) intra prediction modes, and the modes included in the group may not be included in the MPM list.

Or a predetermined candidate in the derived MPM list may be derived as the intra prediction mode of the current block. For example, a mode corresponding to list 0 which is the first mode in the MPM list may be derived as the intra prediction mode of the current block. Or, an index corresponding to a predetermined mode in the list may be encoded/decoded, and the corresponding mode may be derived as the intra prediction mode of the current block.

Regarding configuration of the MPM list, one MPM list may be made for a block of a predetermined size. If the block of the predetermined size is divided into a plurality of sub-blocks, each of the plurality of sub-blocks may use the MPM list.

For example, if the current block corresponds to a block of the predetermined size, an MPM list may be made for the current block. If the current block is divided into one or more sub-blocks, an intra prediction mode may be derived for each of the sub-blocks, using the MPM list. For example, if the current block is of size 8×8 and divided into four 4×4 sub-blocks, an MPM list may be made for the current block, and used for each of the sub-blocks.

Regarding configuration of an MPM list, an MPM list may be made for each of sub-blocks into which a block of a predetermined size is divided.

For example, if the current block corresponds to a block of the predetermined size, an MPM list may be made for each sub-block of the current block, using the intra prediction modes of a neighbor block of the current block. For example, if the current block is of size 8×8 and there are four 4×4 sub-blocks, an MPM list may be made for each of the four sub-blocks, using the intra prediction mode of a neighbor block of the current block. Accordingly, MPM lists may be made simultaneously for the four sub-blocks.

Or the intra prediction mode of the current block may be derived, using at least one of an intra prediction mode of the current block derived by MPM and the intra prediction modes of a neighbor block.

For example, if the intra prediction mode of the current block derived by MPM is Pred_mpm, the intra prediction mode of the current block may be derived by changing Pred_mpm to a specific mode, using one or more intra prediction modes of neighbor blocks.

For example, Pred_mpm may be incremented or decremented by N by comparing Pred_mpm with the intra prediction mode of a neighbor block in size. Herein, N may be a predetermined integer such as +1, +2, +3, 0, −1, −2, or −3. For example, if Pred_mpm is less than the intra prediction mode of a neighbor block and/or a statistic value of the intra prediction modes of one or more neighbor blocks, Pred_mpm may be incremented. Or, if Pred_mpm is greater than the intra prediction mode of the neighbor block, Pred_mpm may be decremented. Or, the intra prediction mode of the current block may be derived based on Pred_mpm and/or a value compared with Pred_mpm.

In the example illustrated in FIG. 13, if Pred_mpm is less than the mode value of f, Pred_mpm+1 may be derived as the intra prediction mode of the current block. Or, if Pred_mpm is less than the mode value of g, Pred_mpm+1 may be derived as the intra prediction mode of the current block. Or, if Pred_mpm is less than the mode value of f, Pred_mpm+2 may be derived as the intra prediction mode of the current block. Or, if Pred_mpm is larger than the mode value of f, Pred_mpm−1 may be derived as the intra prediction mode of the current block. Or, if Pred_mpm is less than the mode value of i, Pred_mpm+1 may be derived as the intra prediction mode of the current block. Or, if Pred_mpm is less than the mean of the mode values of f and i, Pred_mpm+1 may be derived as the intra prediction mode of the current block. Or, if Pred_mpm is less than the mean of the mode values of f and i, an increase of ½ of the difference between Pred_mpm and the mean value may be made. For example, Pred_mpm+{((f+i+1)>>1−Pred_mpm+1)>>1} may be derived as the intra prediction mode of the current block.

Or, if one of Pred_mpm and the mode of a neighbor block is a non-directional mode and the other is a directional mode, the non-directional mode may be derived as the intra prediction mode of the current block, or the directional mode may be derived as the intra prediction mode of the current block.

As described before, the intra prediction mode of the current block may be derived by encoding/decoding. Herein, the intra prediction mode of a neighbor block may not be used. For example, the intra prediction mode of the current block may be derived by entropy-encoding/decoding a bitstream.

For example, if the current block is divided into lower blocks or sub-blocks, the intra prediction mode of each of the sub-blocks may be derived, using at least one of the afore-described methods for deriving an intra prediction mode of a current block.

The size of the current block and the size of a sub-block may be M×N. M and N may be the same or different positive integers. For example, the current block or the sub-block may be at least one of a CTU, CU, SU (signalling unit), QTMax, QTMin, BTMax, BTMin, 4×4, 8×8, 16×16, 32×32, 64×64, 128×128, 256×256, 4×8, 8×16, 16×8, 32×64, 32×8, and 4×32 in size. Herein, QTMax and QTMin may represent maximum and minimum sizes which allow division into a quadtree, respectively, and BTMax and BTMin may represent maximum and minimum sizes which allow division into a binary tree, respectively. Hereinbelow, the size of a sub-block may mean a division structure of a sub-block.

The sub-block size may vary depending on the size of the current block. For example, 1/N of the horizontal and vertical sizes of the current block may be the sub-block size. N may be a positive integer, and may be at least one of 2, 4, 8, 16, 32, and 64. For example, if the current block is of size 32×32 and N for 1/N of the horizontal and vertical sizes of the current block is 4, the sub-block size may be 8×8.

Or, the sub-block size may be a predetermined fixed size irrespective of the size of the current block. For example, the sub-block size may be a minimum size irrespective of the size of the current block, and may be, for example, 4×4.

Or, the sub-block size may be determined based on the division structure of a neighbor block of the current block. For example, if an adjacent neighbor block is divided, the sub-block size may be determined by dividing the current block.

The sub-block size may be determined based on the intra prediction mode of a neighbor block of the current block. For example, the sub-block size may be determined by block division into sub-blocks on the basis of a boundary by which intra prediction modes of neighbor blocks become different.

The sub-block size may be determined based on a coding parameter of a neighbor block. For example, the sub-block size may be determined by block division into sub-blocks based on whether a neighbor block is an intra coding block or an inter coding block.

At least one of the current block size, the sub-block size, and N by which a current block is divided may be fixed to a predetermined value.

For example, in the case where a predetermined fixed size for a current block is 16×16, if the current block is of size 16×16, the current block may be divided into sub-blocks and an intra prediction mode for each sub-block may be derived.

For example, in the case where a predetermined fixed size for a current block is a CTU and N is 4, if the size of the current block is a CTU, an intra prediction mode may be derived on a sub-block basis, each sub-block resulting from dividing the latitude and longitude of the CTU by 4.

The one or more sub-blocks may further be divided into smaller blocks. For example, if the size of the current block is 32×32 and the sub-block size is 16×16, each of one or more sub-blocks may be divided into smaller blocks each of size 8×8, 4×4, 16×8, 4×16, or the like.

At least one of the current block size, the sub-block size, and N by which the current block is divided may be encoded/decoded.

The division structure of a sub-block for the current block may be encoded/decoded. The sub-blocks into which the current block is divided may vary in size and/or shape. Further, an intra prediction mode may be derived for each sub-block.

An indicator (e.g., a flag) indicating that the intra prediction mode of the current block is derived using the intra prediction mode of a neighbor block may be encoded/decoded. For example, the indicator may be NDIP_flag (Neighbouring mode Dependant Intra Prediction). The indicator may be encoded/decoded for at least one of the current block or each sub-block. The indicator may be encoded/decoded, only when the current block size or the sub-block size corresponds to a predetermined size or a predetermined size range. The predetermined size may be, for example, 64×64 or BTMax. As described before, the current block may be divided into a plurality of sub-blocks. The division structure of a sub-block may be predefined or encoded/decoded.

If NDIP_flag is 1 for the current block, the intra prediction mode of the current block or the intra prediction mode of each sub-block of the current block may be derived using the intra prediction mode of a neighbor block. In this case, at least one of prev_intra_luma_pred_flag, mpm_idx, rem_intra_luma_pred_mode, intra_chroma_pred_mode, split_flag, QB_flag, quadtree_flag, binarytree_flag, and Btype_flag for the current block and/or a sub-block may not be encoded/decoded.

For example, if NDIP_flag is 1 for the current block, the intra prediction mode of the current block may be decoded, and then the intra prediction mode of each sub-block may be derived using the decoded intra prediction mode and the intra prediction mode of a neighbor block. Herein, at least one of prev_intra_luma_pred_flag, mpm_idx, rem_intra_luma_pred_mode, intra_chroma_pred_mode, split_flag, QB_flag, quadtree_flag, binarytree_flag, and Btype_flag for the sub-block may not be encoded/decoded.

If NDIP_flag is 0 for the current block, information related to at least one of the intra prediction mode of the current block or the sub-block and division information of a sub-block may be encoded/decoded.

Among the sub-blocks of the current block, the intra prediction mode of a first sub-block may be derived in a different manner from the other sub-blocks. The first sub-block may be one of a plurality of sub-blocks in the current block. For example, the first sub-block may be a first sub-block in a Z scan order.

The intra prediction mode of the first sub-block may refer to an initial mode. For example, if the intra prediction mode of each sub-block is derived as the mean of the intra prediction modes of blocks to the left of and above the sub-block, the initial mode may be derived in a different method. The different method for deriving the initial mode may be at least one of the methods for deriving an intra prediction mode according to the present invention.

For example, an $N^{th}$ (e.g., first) mode listed in an MPM list may be derived as the initial mode. Or, the most frequent one of the intra prediction modes of one or more neighbor blocks of the current block may be derived as the initial mode. Or, an intra prediction mode encoded/decoded for the current block may be derived as the initial mode. Or, an intra prediction mode encoded/decoded for the first sub-block may be derived as the initial mode.

Regarding derivation of an intra prediction mode for a sub-block in the current block, the intra prediction modes of one or more sub-blocks may be derived in an arbitrary order. The arbitrary order may be a scanning order, and scanning may correspond to at least one of raster scanning, upright scanning, vertical scanning, horizontal scanning, diagonal scanning, and zigzag scanning. The number of sub-blocks for which intra prediction modes are derived in the scanning order may be 1 or larger. The arbitrary order may be determined adaptively according to the intra prediction mode of a neighbor block.

Figure 14:
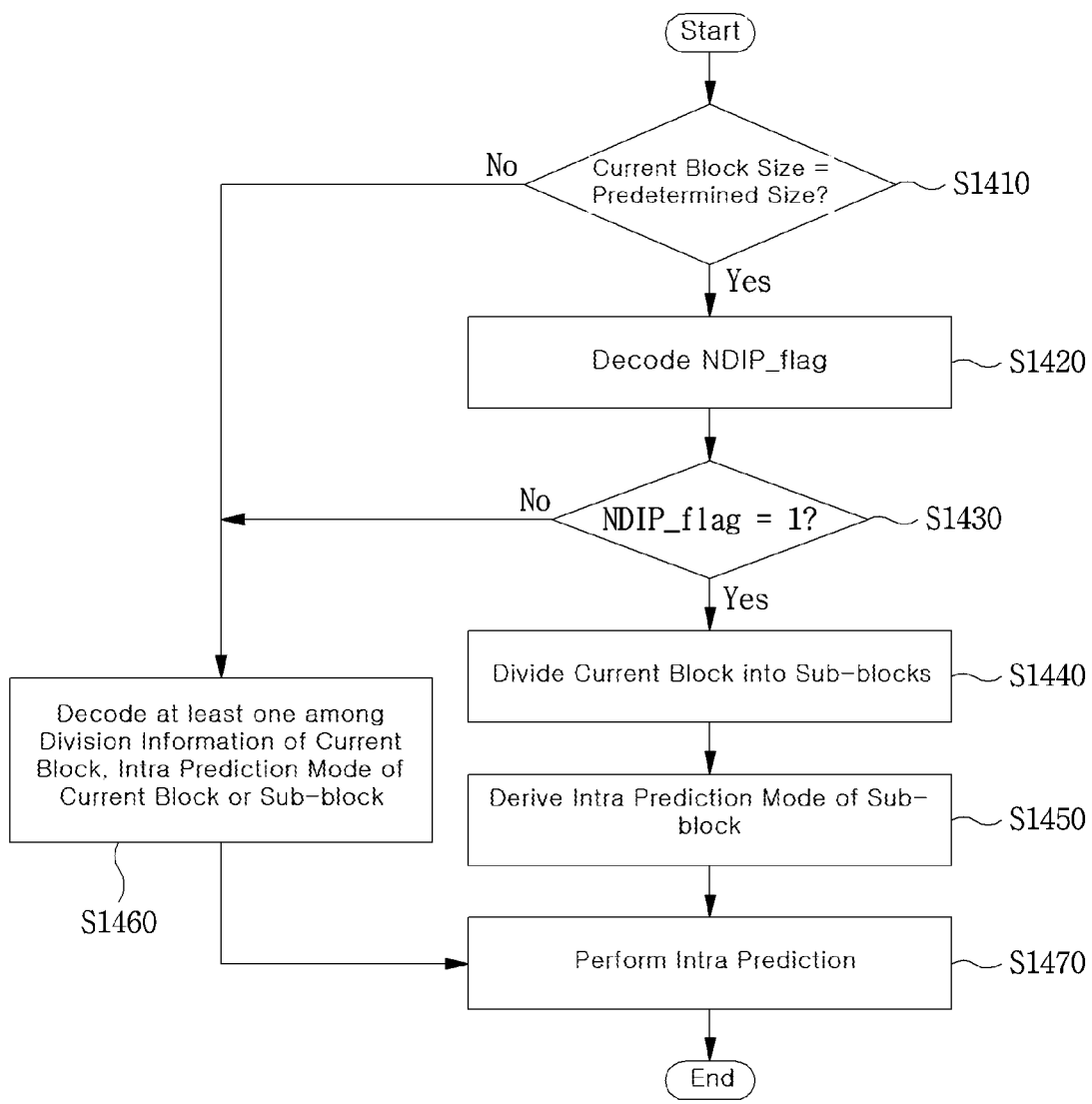
FIG. 14 is a view depicting an embodiment of deriving an intra prediction mode of each of one or more sub-blocks into which a current block is divided.

FIG. 14 is a view depicting an embodiment of deriving an intra prediction mode of each of one or more sub-blocks into which a current block is divided.

First, it may be determined whether the size of the current block corresponds to a predetermined size (S1410). The predetermined size may be determined by the horizontal or vertical length of the current block. For example, the determination is made depending on whether the horizontal or vertical length of the current block is a dividable length for division into sub-blocks in step S1410.

For example, in the case where the current block is a square with the same horizontal and vertical lengths, if a length obtained by dividing each of the horizontal and vertical lengths by N is equal to or greater than an arbitrary length, the size of the current block may correspond to the predetermined size. For example, in the case where N is 4 and the arbitrary length is 4, if the current block is of one of sizes 256×256, 128×128, 64×64, 32×32, and 16×16, the size of the current block may correspond to the predetermined size.

For example, in the case where the current block is a rectangle with different horizontal and vertical lengths, if the smaller between a length obtained by dividing the larger between the horizontal and vertical lengths by M and a length obtained by dividing the smaller between the horizontal and vertical lengths by N is equal to or greater than an arbitrary length, the size of the current block may correspond to the predetermined size. For example, in the case where M is 4, N is 2, and the arbitrary length is 4, if the current block is of one of sizes 128×64, 64×128, 128×32, 32×128, 128×16, 16×128, 128×8, 8×128, 64×32, 32×64, 64×16, 16×64, 64×8, 8×64, 32×16, 16×32, 32×8, 8×32, 16×8, and 8×16, the size of the current block may correspond to the predetermined size.

For example, if the current block is not divided any further, the size of the current block may correspond to the predetermined size. For example, if division information, quadtree division information, and/or binary tree division information about the current block is 0, indicating that the current block is not divided, and the horizontal or vertical length of the current block is larger than a minimum length, the size of the current block may correspond to the predetermined size. Herein, the minimum length may be 4.

If the size of the current block does not correspond to the predetermined size (No in S1410), the division information and intra prediction mode of the current block may be decoded (S1460). If the current block is not divided, the intra prediction mode of the current block may be decoded. If the current block is divided into sub-blocks, the intra prediction mode of each sub-block may be decoded.

If the size of the current block corresponds to the predetermined size (Yes in S1410), NDIP_flag may be decoded (S1420). In the next step, the value of the decoded NDIP_flag may be checked (S1430).

If NDIP_flag is 0 (No in S1430), at least one of the division information about the current block, the intra prediction mode of the current block, and the intra prediction mode of a sub-block may be decoded (S1460).

If NDIP_flag is 1 (Yes in S1430), the current block may be divided into sub-blocks (S1440). Herein, the division may be performed so that each of the sub-blocks has a predetermined size and/or shape. Or the division may be performed based on decoded division information.

In the next step, the intra prediction mode of a sub-block generated by dividing the current block may be derived (S1450). The intra prediction mode of the block may be derived based on the intra prediction mode of a neighbor block. Or the intra prediction mode of the current block may be decoded and used.

Intra prediction may be performed using the intra prediction mode derived for the current block or the sub-block (S1470).

FIG. 15 is a view depicting an embodiment of dividing a current block into sub-blocks.

An order of deriving the intra prediction modes of a plurality of sub-blocks in a current block may be a raster scanning order based on the current block. Or, the order may be a raster scanning order based on a predetermined block size. For example, the intra prediction modes of the sub-blocks may be derived in the order of C1, C2, C3, . . . , C16. Or the intra prediction modes of the sub-blocks may be derived in the order of C1, C2, C5, C6, C3, C4, . . . , C12, C15, C16. Or the intra prediction mode of each sub-block may be derived in parallel. The intra prediction mode of each sub-block may be derived in at least one of the methods for deriving an intra prediction mode of a current block.

For example, if the current block is divided into sub-blocks and an intra prediction mode for each sub-block is derived, the intra prediction mode of a neighbor block may be used.

For example, a statistic value of the intra prediction modes of blocks to the left of and above a sample at a position (0, 0) of each sub-block may be derived as the intra prediction mode of the sub-block. For example, if the statistic value is a mean value, the intra prediction mode of each sub-block illustrated in FIG. 15 may be derived by [Equation 4] below.

$C1=(j+d+1)>>1,$ $C2=(C1+e+1)>>1,$ $C3=(C2+g+1)>>1,$ $C4=(C3+g+1)>>1,$ $C5=(j+C1+1)>>1,$ $C6=(C5+C2+1)>>1,$ $C7=(C6+C3+1)>>1,$ $C8=(C7+C4+1)>>1,$ $C9=(k+C5+1)>>1,$ $C10=(C9+C6+1)>>1,$ $C11=(C10+C7+1)>>1,$ $C12=(C11+C8+1)>>1,$ $C13=(l+C9+1)>>1,$ $C14=(C13+C10+1)>>1,$ $C15=(C14+C11+1)>>1,$ $C16=(C15+C12+1)>>1.$ [Equation 4]

Or, the sizes of the blocks to the left of and above the sample at the position (0, 0) of each sub-block may be compared with each other, and the intra prediction mode of a block having the larger size may be derived as the intra prediction mode of the sub-block. If the two blocks have the same size, the mean value of the intra prediction modes of the left and upper blocks may be derived as the intra prediction mode of the sub-block.

Or, the sizes of the intra prediction modes of the blocks to the left of and above the sample at the position (0, 0) of each sub-block may be compared with each other, and an intra prediction mode having the smaller value may be derived as the intra prediction mode of the sub-block. If the values of the two modes are equal, one of the two modes may be derived as the intra prediction mode of the sub-block.

Or the intra prediction mode of each sub-block may be derived using the intra prediction mode of a neighbor block of the current block. Herein, the intra prediction modes of one or more neighbor blocks of the current block, to the left of and/or above the sample position (0, 0) of each sub-block may be used. For example, the intra prediction mode of each sub-block illustrated in FIG. 15 may be derived by [Equation 15] below.

$C1=(j+d+1)>>1,$ $C2=e,$ $C3=g,$ $C4=g,$ $C5=j,$ $C6=(j+e+1)>>1,$ $C7=g,$ $C8=g,$ $C9=k,$ $C10=k,$ $C11=(k+g+1)>>1,$ $C12=g,$ $C13=l,$ $C14=l,$ $C15=l,$ $C16=(l+g+1)>>1.$ [Equation 5]

Or, if all of the intra prediction modes of neighbor blocks of the current block are non-directional modes, the intra prediction mode of a sub-block may be derived as at least one of the non-directional modes (e.g., the DC mode and the Planar mode).

FIG. 16 is a view depicting another embodiment of dividing a current block into sub-blocks.

As illustrated in FIG. 16, sub-blocks in a current block may vary in size and/or shape. The division structure and/or size of the current block and/or a sub-block may be determined by encoding/decoding. The intra prediction mode of each sub-block may be derived in at least one of the afore-described methods for deriving an intra prediction mode of a current block or a sub-block.

For example, a statistic value of the intra prediction modes of blocks to the left of and above a sample at a position (0, 0) of each sub-block may be derived as the intra prediction mode of the sub-block. For example, if the statistic value is a mean value, the intra prediction modes of the sub-blocks illustrated in FIG. 16 may be derived by [Equation 6] below.

$C1=(j+d+1)>>1,$ $C2=(C1+e+1)>>1,$ $C3=(C2+g+1)>>1,$ $C4=(k+C1+1)>>1,$ $C5=(C4+C2+1)>>1,$ $C6=(l+C4+1)>>1,$ $C7=(C6+C5+1)>>1,$ $C8=(C5+C3+1)>>1,$ $C9=(C8+C3+1)>>1,$ $C10=(C7+C8+1)>>1.$ [Equation 6]

Or, a statistic value of the intra prediction modes of one or more neighbor blocks adjacent to each sub-block may be derived as the intra prediction mode of the sub-block. For example, if the statistic value is a mean value, the intra prediction mode of each sub-block illustrated in FIG. 16 may be derived by [Equation 7] below.

$C1=(b+j+d)/3,$ $C2=(C1+d+e)/3,$ $C3=(C2+e+g)/3,$ $C4=(k+j+C1)/3,$ $C5=(C4+C2+C1)/3,$ $C6=(l+C4+k)/3,$ $C7=(C6+C5+C4)/3,$ $C8=(C5+C3+C2)/3,$ $C9=(C8+C3)/2,$ $C10=(C5+C8+C9+C7)/4.$ [Equation 7]

Or, if all of the intra prediction modes of the neighbor blocks of the current block are non-directional modes, the intra prediction mode of the sub-block may be derived as at least one of the non-directional modes (e.g., the DC mode and the Planar mode).

In the case where the current block is divided into sub-blocks and an intra prediction mode for each sub-block is derived, the intra prediction mode of the current block may be derived by MPM, and then the intra prediction mode of each sub-block may be derived, using the derived mode and the intra prediction mode of a neighbor block. Herein, the intra prediction mode of the sub-block may be derived in at least one of the methods for deriving an intra prediction mode of a current block, using at least one of the intra prediction mode of the current block derived by MPM and the intra prediction mode of the neighbor block. If the intra prediction mode of the current block derived by MPM is Pred_mpm, the intra prediction mode of the sub-block may be derived in the following manner.

For example, the mean value of the intra prediction modes of blocks to the left of and above a sample at the position (0, 0) of each sub-block is compared with Pred_mpm. If the mean value is larger than Pred_mpm, Pred_mpm+1 may be derived as the intra prediction mode of the sub-block, and if the mean value is less than Pred_mpm, Pred_mpm−1 may be derived as the intra prediction mode of the sub-block. Or, the mean value of the intra prediction modes of blocks to the left of and above the sample at the position (0, 0) of each sub-block, and Pred_mpm may be derived as the intra prediction mode of the sub-block. Or, the intra prediction mode of the sub-block may be derived by comparing the intra prediction modes of the blocks to the left of and above the sample at the position (0, 0) of each sub-block with Pred_mpm, and adjusting Pred_mpm. Herein, at least one of the afore-described statistic values may be used, instead of the mean value.

FIG. 17 is a view depicting another embodiment of dividing a current block into sub-blocks.

In FIG. 17, a number marked on each block denotes the number of the intra prediction mode of the block. Further, $Cx$ (x is 1 ... 16) denotes an $x^{th}$ sub-block of a current block. Further, an arrow denotes the direction or angle of the intra prediction mode of the block.

For example, a statistic value of the intra prediction modes of blocks to the left of and above a sample at a position (0, 0) of each sub-block may be derived as the intra prediction mode of the sub-block. The statistic value may be, for example, a mean value. Or if at least one of the intra prediction modes of the neighbor blocks is a non-directional mode, the intra prediction mode of the sub-block may be derived as a directional mode among the intra prediction modes of the neighbor blocks. The non-directional mode may include, for example, the Planar mode (mode number 0) and the DC mode (mode number 1). For example, the intra prediction mode of each sub-block illustrated in FIG. 17 may be derived by [Equation 8] below.

$C1=(30+50+1)>>1=40$ $C2=(40+50+1)>>1=45$ $C3=45$ $C4=(45+58+1)>>1=52$ $C5=(18+40+1)>>1=29$ $C6=(29+45+1)>>1=37$ $C7=(37+45+1)>>1=41$ $C8=(41+52+1)>>1=47$ $C9=(16+29+1)>>1=23$ $C10=(23+37+1)>>1=30$ $C11=(30+41+1)>>1=36$ $C12=(36+47+)>>1=42$ $C13=23$ $C14=(23+30+1)>>1=27$ $C15=(27+36+1)>>1=32$ $C16=(32+42+1)>>1=37$  [Equation 8]

FIG. 18 is a view depicting another embodiment of dividing a current block into sub-blocks.

In FIG. 18, a number marked on each block denotes the number of the intra prediction mode of the block. Further, $Cx$ (x is 1 ... 14) denotes an $x^{th}$ sub-block of a current block. Further, an arrow denotes the direction or angle of intra prediction for the block.

In the embodiment described with reference to FIG. 18, at least one of the intra prediction mode of a current block and division information of a sub-block may be derived through decoding. The intra prediction mode of each sub-block in the current block may be derived, using the derived intra prediction mode of the current block, and the mean value of the intra prediction modes of blocks to the left of and above a sample at a position (0, 0) of each sub-block. For example, if the derived intra prediction mode of the current block is larger than the mean value, ½ of the mean value may be subtracted from the derived intra prediction mode. If the derived intra prediction mode of the current block is equal to or less than the mean value, ½ of the mean value may be added to the derived intra prediction mode. Herein, instead of the mean value, at least one of the afore-described statistic values may be used.

Or if at least one of the intra prediction modes of the neighbor blocks is a non-directional mode, the intra prediction mode of the sub-block may be derived as a directional mode among the intra prediction modes of the neighbor blocks. The non-directional mode may include, for example, the Planar mode (mode number 0) and the DC mode (mode number 1). For example, if the derived intra prediction mode of the current block is 52, the intra prediction mode of each sub-block illustrated in FIG. 18 may be derived by [Equation 9] below.

$C1: abs(52-((30+50+1)>>1)+1)>>1=6, C1=52-6=46$ $C2: abs(52-((46+50+1)>>1)+1)>>1=2, C2=52-2=50$ $C3: abs(52-((50+64+1)>>1)+1)>>1=3, C3=52+3=55$ $C4: abs(52-((18+46+1)>>1)+1)>>1=10, C4=52-10=42$ $C5: abs(52-((42+50+1)>>1)+1)>>1=3, C5=52-3=49$ $C6: abs(52-((42+49+1)>>1)+1)>>1=3, C6=52-3=49$ $C7: abs(52-((49+55+1)>>1)+1)>>1=0, C7=52-0=52$ $C8: abs(52-((52+55+1)>>1)+1)>>1=1, C8=52+1=53$ $C9: abs(52-((16+42+1)>>1)+1)>>1=12, C9=52-12=40$ $C10: abs(52-((16+40+1)>>1)+)>>1=12, C10=52-12=40$ $C11: abs(52-40+1)>>1=6, C11=52-6=46$ $C12: \text{abs}(52-((40+49+1)>>1)+1)>>1=4, C12=52-4=48$ $C13: \text{abs}(52-((48+49+1)>>1)+1)>>1=2, C13=52-2=50$ $C14: \text{abs}(52-((50+52+1)>>1)+1)>>1=1, C14=52-1=51$ [Equation 9]

To derive an intra prediction mode, information about intra prediction may be decoded (e.g., entropy-decoded) from a bitstream. The information about intra prediction may be signaled in at least one of a VPS (video parameter set), an SPS (sequence parameter set), PPS (picture parameter set), an APS (adaptation parameter set), a slice header, a tile header, a CTU, a CU, and a PU. The information about intra prediction may include at least one of the following pieces of information.

a flag indicating whether reference sample filtering is applied: e.g.) intra_reference_sample_filtering_flag An index specifying the type of reference sample filtering: e.g.) reference_sample_filtering_idx A flag indicating whether an MPM (Most Probable Mode) is matched: e.g.) prev_intra_luma_pred_flag An index indicating a position in an MPM list: e.g.) mpm_idx A flag indicating whether an intra prediction mode is included in a group of predetermined ones of non-MPM modes: e.g.) non_mpm_group_flag An index indicating a position in the group: e.g.) group_mode_idx intra prediction mode information on luma component: e.g.) rem_intra_luma_pred_mode intra prediction mode information on chroma component: e.g.) intra_chroma_pred_mode A curvature parameter of a sample-wise directional intra prediction mode: e.g.) cuv A row and/or column weight parameter set for a sample-wise directional intra prediction mode: e.g.) cw1, cw2, ... , cwNs-1

A look-up-table (LUT) for sample-wise directional intra prediction

A flag indicating that the intra prediction modes of a current block and a sub-block are derived using the intra prediction mode of a neighbor block: e.g.) NDIP_flag A flag indicating whether filtering is applied to a prediction sample: e.g.) predicted_sample_filtering_flag Decoding of the information about intra prediction may be performed based on at least one coding parameter. For example, encoding/decoding of NDIP_flag may be performed based on information related to block division information. For example, if at least one of split_flag, quadtree_flag, and binarytree_flag is 0, that is, if the block is not divided any further, the encoding/decoding of NDIP_flag may be performed.

For a block size equal to or less than a predetermined block size, at least one piece of information in the information about intra prediction may not be signaled. For example, if the size of the current block corresponds to a predetermined size, one or more of pieces of information about intra prediction for the current block may not be signaled, and one or more pieces of information about intra prediction for a previously encoded/decoded block of a larger size may be used.

In entropy encoding/decoding of at least one piece of information in the information about intra prediction, at least one of the following binarization methods may be used.

Truncated Rice binarization method
K-th order Exp_Golomb binarization method
Limited K-th order Exp_Golomb binarization method
Fixed-length binarization method
Unary binarization method
Truncated Unary binarization method If the MPM (Most Probable Mode) flag is 1, an intra luma prediction mode may be derived, using an MPM index (mpm_idx) and at least one of the intra prediction modes of encoded/decoded adjacent units.

If the MPM (Most Probable Mode) flag is 0, a flag indicating whether an intra prediction mode is included in a group of predetermined modes among non-MPM modes is parsed. If the parsed flag is 1, the intra prediction mode may be derived using the group mode index (group_mode_idx).

If at least one of the MPM (Most Probable Mode) flag and the flag indicating whether an intra prediction mode is included in a group of predetermined modes among non-MPM modes is 0, the intra luma prediction mode may be encoded/decoded using the intra luma prediction mode index (rem_intra_luma_pred_mode).

An intra chroma prediction mode may be derived, using at least one of the intra chroma prediction mode index (intra_chroma_pred_mode) and/or the intra prediction mode of a corresponding luma block. Or, an MPM list may be made, using at least one of an intra prediction mode neighboring a chroma block, the intra prediction mode of a corresponding luma block and an intra prediction mode neighboring the luma block, and a predetermined intra prediction mode, and the intra chroma prediction mode may be derived, using the MPM list.

A curvature parameter (cuv) of the sample-wise directional intra prediction mode may refer to a curvature applied to the sample-wise directional intra prediction mode. Sample-wise directional intra prediction may be performed for the current block, using at least one cuv. The curvature parameter may be derived from curvature parameters of neighbor blocks.

A row and/or column weight parameter set (cw) for the sample-wise directional intra prediction mode may be a vector. Row and/or column weight parameters may be applied on a row and/or column basis in the current block. For example, in the case of row-wise application to an N×M block, the row weight parameter set may have N weight parameters. In addition, in the case of column-wise application, the column weight parameter set may have M weight parameters. The weight parameters and/or the weight parameter set may be derived from weight parameters and/or weight parameter sets of neighbor blocks.

Various types of sample-wise directional intra prediction may be performed using at least one of cuv and cw. Herein, the number of each of cuv's and cw's may be 1 or larger.

Intra prediction may be performed for the current block by generating at least N×M×4 prediction blocks using N cuv's and M cw's. For example, intra prediction may be performed for the current block by at least 4 prediction blocks using 1 cuv and 1 cw. For example, intra prediction may be performed for the current block by generating at least 8 prediction blocks using 2 cuv's and 1 cw.

Two or more pieces of cuv and/or cw information may be encoded/decoded, using a default value and a delta value. Herein, the default value may refer to one cuv value and/or one cw value, and the delta value may be a constant.

For example, if two cuv's are used for the current block, default_cuv and delta_cuv may be decoded from a bitstream. Herein, two curvature parameters may be default_cuv and default_cuv+delta_cuv.

For example, if N cuv's are used for the current block, default_cuv and delta_cuv may be decoded from a bitstream. Herein, N curvature parameters may be default_cuv, default_cuv+delta_cuv, default_cuv+2*delta_cuv, ..., default_cuv+(N−1)*delta_cuv (N is a positive integer equal to or greater than 2).

For example, if 2N+1 cuv's are used for the current block, 2N+1 curvature parameters may be default_cuv, default_cuv+delta_cuv, default_cuv-delta_cuv, default_cuv+2*delta_cuv, default_cuv-2*delta_cuv, ..., default_cuv+N*delta_cuv, default_cuv-N*delta_cuv (N is a positive integer equal to or greater than 1).

For example, if 2 cw's are used for the current block, default_cw and delta_cw may be decoded from a bitstream. Herein, 2 weight parameters may be default_cw and default_cw+delta_cw (default_cw+delta_cw is an addition at a vector element level).

For example, if M cw's are used for the current block, default_cw and delta_cw may be decoded from a bitstream. Herein, M weight parameters may be default_cw, default_cw+delta_cw, default_cw+2*delta_cw, ..., default_cw+(M−1)*delta_cw (default_cw+delta_cw is an addition at a vector element level and M is a positive integer equal to or greater than 2).

For example, if 2M+1 cw's are used for the current block, 2M+1 curvature parameters may be default_cw, default_cw+delta_cw, default_cw−delta_cw, default_cw+2*delta_cw, default_cw−2*delta_cw, ..., default_cw+M*delta_cw, default_cw−M*delta_cw (M is a positive integer equal to or greater than 1).

Now, a detailed description will be given of the reference sample construction step S1220.

In intra prediction of the current block or a sub-block having a smaller size and/or shape than the current block, a reference sample may be constructed for the prediction. The following description is given in the context of the current block, and the current block may mean a sub-block. The reference sample may be constructed, using one or more reconstructed samples or sample combinations neighboring to the current block. Additionally, filtering may be applied in constructing the reference sample. Herein, the reference sample may be constructed using each reconstructed sample on a plurality of reconstructed sample lines, as it is. Or, the reference sample may be constructed after filtering between samples on the same reconstructed sample line. Or, the reference sample may be constructed after filtering between samples on different reconstructed sample lines. The constructed reference sample may be denoted by ref[m, n], and a reconstructed neighbor sample or a sample obtained by filtering the reconstructed neighbor sample may be denoted by rec[m, n]. Herein, m or n may be a predetermined integer value. In the case where the current block is of size W(horizontal) x H(vertical), if a left uppermost sample position of the current block is (0, 0), a relative position of a left uppermost reference sample closest to the sample position may be set to (−1, −1).

Figure 19:
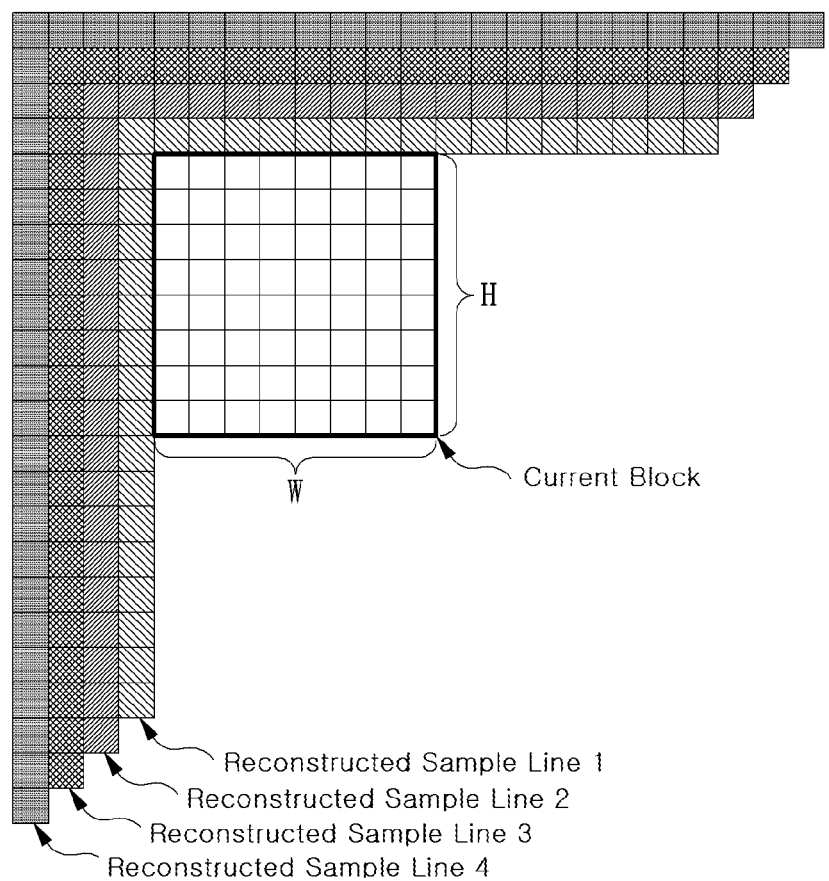
FIG. 19 is an exemplary view depicting neighbor reconstructed sample lines which may be used for intra prediction of a current block.

FIG. 19 is an exemplary view depicting neighbor reconstructed sample lines which may be used for intra prediction of a current block.

As illustrated in FIG. 19, a reference sample may be constructed using one or more reconstructed sample lines adjacent to the current block.

For example, one of a plurality of reconstructed sample lines illustrated in FIG. 19 may be selected, and a reference sample may be constructed using the selected reconstructed sample line. A predetermined one of the plurality of reconstructed sample lines may be fixedly selected as the selected reconstructed sample line. Or, a specific one of the plurality of reconstructed sample lines may be adaptively selected as the selected reconstructed sample line.

For example, a reference sample may be constructed using one or more of the plurality of reconstructed sample lines illustrated in FIG. 19 in combination. For example, a reference sample may be constructed as a weighted sum (or weighted mean) of one or more reconstructed samples. Weights used for the weighted sum may be assigned based on distances from the current block. Herein, a larger weight may be assigned for a shorter distance to the current block. For example, the following [Equation 10] may be used.

$$\text{ref}[-1, -1] = (\text{rec}[-2, -1] + 2*\text{rec}[-1, -1] + \text{rec}[-1, -2] + 2) >> 2$$

$$\text{ref}[x, -1] = (\text{rec}[x, -2] + 3*\text{rec}[x, -1] + 2) >> 2, (x=0 \sim W+H-1)$$

$$\text{ref}[-1, y] = (\text{rec}[-2, y] + 3*\text{rec}[-1, y] + 2) >> 2, (y=0 \sim W+H-1)$$

[Equation 10]

Or, a reference sample may be constructed using at least one of the mean value, maximum value, minimum value, median value, and most frequent value of a plurality of reconstructed samples based on at least one of distances from the current block or intra prediction modes.

Or, a reference sample may be constructed based on a change (variation) in the values of a plurality of contiguous reconstructed samples. For example, a reference sample may be constructed based on at least one of whether the difference between the values of two contiguous reconstructed samples is equal to or larger than a threshold, whether the values of the two contiguous reconstructed samples are changed continuously or non-continuously, and so on. For example, if the difference between rec[−1, −1] and rec[−2, −1] is equal to or larger than a threshold, ref[−1, −1] may be determined to be rec[−1, −1], or a value obtained by applying a weighted mean with a predetermined weight assigned to rec[−1, −1]. For example, if as a plurality of contiguous reconstructed samples are nearer to the current bloc, the values of the plurality of contiguous reconstructed samples are changed by n each time, a reference sample, ref[−1, −1] may be determined to be rec[−1, −1]−n.

For example, a reference sample may be constructed by selecting two or more of the plurality of reconstructed sample lines illustrated in FIG. 19. For example, reconstructed sample line 1 and reconstructed sample line 2 may be fixedly selected. Or, two or more reconstructed sample lines may be selected adaptively. Or, one line may be fixedly selected, and one or more other lines may be adaptively selected.

If one or more of the plurality of reconstructed sample lines are fixedly selected, information about the fixedly selected lines may not be signaled.

If one or more of the plurality of reconstructed sample lines are adaptively selected, information about the adaptively selected lines may be signaled. The information may be, for example, an indicator or index specifying the adaptively selected lines. Or, without the information being signaled, the one or more reconstructed sample lines may be adaptively selected, using at least one of the size, shape, and intra prediction mode of the current block and/or a neighbor block.

A reference sample line may be constructed with one or more samples. For example, the reference sample line may be constructed to the same length as the horizontal or vertical length of the current block. Or, the reference sample line may be constructed to a double of the horizontal or vertical length of the current block. Or, the reference sample line may be constructed to a length obtained by adding 1, 2, 3, ... N samples to the horizontal or vertical length of the current block. For example, the reference sample line may be constructed with 2*(W+H)+N samples.

The number of adjacent reference sample lines above the current block may be different from the number of adjacent reference sample lines to the left of the current block. For example, one adjacent reference sample line may be constructed above the current block and two adjacent reference sample lines may be constructed to the left of the current block, according to the size, shape, and/or intra prediction mode of the current block.

The length of an adjacent reference sample line above the current block may be different from the length of an adjacent reference sample line to the left of the current block. For example, the lengths may be different according to the size, shape, and/or intra prediction mode of the current block.

The length of a reference sample line may be different for each reconstructed sample line. For example, reconstructed sample line n may be constructed to be longer or shorter than reconstructed sample line n−1 by m samples. In the example illustrated in FIG. 19, reconstructed sample line n is constructed to be longer than reconstructed sample line n−1 by one sample.

Or, each of the reference sample lines may be reconstructed by a shift according to an intra prediction mode. For example, in the absence of a reference sample at a position referenced by an intra prediction mode, a corresponding reference sample line may be shifted so that a reference sample may be present at the position. Which reference sample line to be shifted or by how much may be determined based on an intra prediction mode, a prediction angle, and/or the position of a reference sample line.

As described above, information indicating whether to construct a reference sample using only the closest reference sample line or a plurality of reference sample lines may be encoded/decoded. For example, the information may be encoded/decoded at at least one of a sequence level, a picture level, a slice level, a tile level, a CTU level, a CU level, a PU level, and a TU level. In addition, information about the availability of a plurality of reference sample lines may be signaled at a higher level.

At least one of the number, positions, and construction method of a plurality of reconstructed sample lines used to construct a reference sample may be changed according to cases where an upper boundary and/or left boundary of the current block corresponds to the boundary of at least one of a picture, a slice, a tile, and a CTB. For example, in the case where two or more reference sample lines are constructed, if the upper boundary of the current block corresponds to at least one of a picture, a tile, a slice, and a CTB, n upper adjacent reference sample lines may be constructed. Herein, n may be, for example, 1.

In selecting the reference sample, a decision as to the availability of a block including the reference sample and/or padding may be performed. For example, if the block including the reference sample is available, the reference sample may be used. Meanwhile, if the block including the reference sample is not available, the unavailable reference sample may be replaced with one or more available neighbor reference samples by padding.

If the reference sample exists outside at least one of a picture boundary, a tile boundary, a slice boundary, a CTB boundary, and a predetermined boundary, it may be determined that the reference sample is not available.

In the case where the current block is encoded by CIP (constrained intra prediction), if the block including the reference sample is encoded/decoded in an inter prediction mode, it may be determined that the reference sample is not available.

Figure 20:
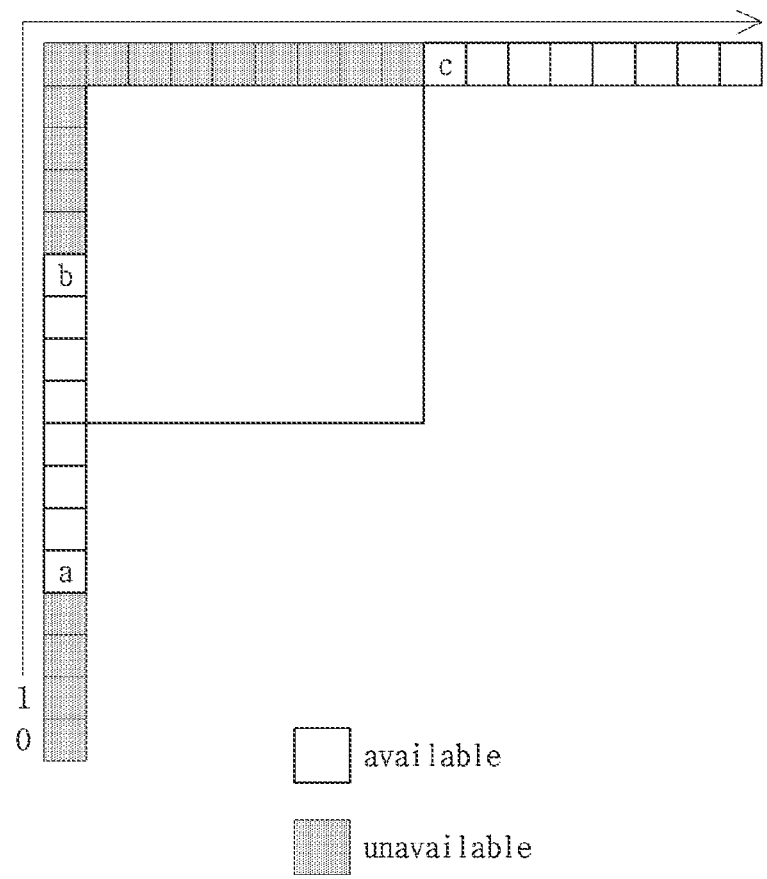
FIG. 20 is a view depicting a method for replacing an unavailable reconstructed sample, using an available reconstructed sample.

FIG. 20 is a view depicting a method for replacing an unavailable reconstructed sample, using an available reconstructed sample.

If it is determined that the neighbor reconstructed sample is unavailable, the unavailable sample may be replaced, using a neighbor available reconstructed sample. For example, as illustrated in FIG. 20, in the presence of available samples and unavailable samples, an unavailable sample may be replaced, using one or more available samples.

The sample value of an unavailable sample may be replaced with the sample value of an available sample in a predetermined order. An available sample adjacent to an unavailable sample may be used to replace the unavailable sample. In the absence of an adjacent available sample, the first appearing available sample or the closest available sample may be used. A replacement order of unavailable samples may be a left lowermost to right uppermost order. Or the replacement order of unavailable samples may be a right uppermost to left lowermost order. Or the replacement order of unavailable samples may be a left uppermost to right uppermost and/or left lowermost order. Or the replacement order of unavailable samples may be a right uppermost and/or left lowermost to left uppermost order.

As illustrated in FIG. 20, unavailable samples may be replaced in an order from a left lowermost sample position 0 to a right uppermost sample. In this case, the values of the first four unavailable samples may be replaced with the value of the first appearing or closest available sample a. The values of the next 13 unavailable samples may be replaced with the value of the last available sample b.

Or, an unavailable sample may be replaced, using a combination of available samples. For example, the unavailable sample may be replaced using the mean value of available samples adjacent to both ends of the unavailable sample. For example, in FIG. 20, the first four unavailable samples may be filled with the value of the available sample a, and the next 13 unavailable samples may be filled with the mean value of the available sample b and an available sample c. Or, the 13 unavailable samples may be filled with any value between the values of the available samples b and c. In this case, the unavailable samples may be replaced with difference values. For example, as an unavailable sample is nearer to the available sample a, the value of the unavailable sample may be replaced with a value close to the value of the available sample a. Similarly, as an unavailable sample is nearer to the available sample b, the value of the unavailable sample may be replaced with a value close to the value of the available sample b. That is, the value of an unavailable sample may be determined based on the distance from the unavailable sample to the available sample a and/or b.

To replace an unavailable sample, one or more of a plurality of methods including the above methods may be selectively applied. A method for replacing an unavailable sample may be signaled by information included in a bitstream, or a method predetermined by an encoder and a decoder may be used. Or the method for replacing an unavailable sample may be derived by a predetermined scheme. For example, a method for replacing an unavailable sample may be selected based on the difference between the values of the available samples a and b and/or the number of unavailable samples. For example, a method for replacing an unavailable sample may be selected based on a comparison between the difference between the values of two available samples and a threshold and/or a comparison between the number of unavailable samples and a threshold. For example, if the difference between the values of the two available samples is larger than the threshold and/or if the number of unavailable samples is larger than the threshold, the values of unavailable samples may be replaced with different values.

A method for replacing an unavailable sample may be selected on a predetermined unit basis. For example, a method for replacing an unavailable sample may be selected on the basis of at least one of, for example, a video, a sequence, a picture, a slice, a tile, a CTU, a CU, a PU, and a TU. Herein, selection of a method for replacing an unavailable sample may be based on information signaled on the predetermined unit basis or derived on the predetermined unit basis. Or a method predetermined by an encoder and a decoder may be applied.

For a reference sample at a predetermined position, padding may be performed without a decision as to the availability of a block including the reference sample. For example, in the example illustrated in FIG. 19, a reference sample located at a position larger than the length of W+H may be padded, using an adjacent reference sample without the availability determination. For example, a sample ref [W+H, −2] may be padded with the value of ref[W+H−1, −2] without the availability determination. Or, samples ref[W+H, −3] and ref[W+H+1, −3] may be padded with the value of ref[W+H−1, −3] without the availability determination.

Among reference samples above the current block outside the horizontal length of the current block, the availability determination and/or padding may be performed for as many samples as the vertical length of the current block. Meanwhile, among reference samples to the left of the current block outside the vertical length of the current block, the availability determination and/or padding may be performed for as many samples as the horizontal length of the current block. For example, the availability determination and/or padding may be performed for a reference sample corresponding to rec[x, −1] (x=−1~W+H−1) and/or rec[−1, y] (y=0~H+W−1).

For the constructed one or more reference samples, whether to apply filtering and/or a filtering type may be determined in a different manner based on at least one of the intra prediction mode, size, and/or shape of the current block. For the plurality of reference sample lines, for example, it may be determined differently whether to apply filtering. For example, filtering may be applied to a first adjacent reference sample line, and filtering may not be applied to a second adjacent reference sample line.

Further, for example, both a filtered value and a non-filtered value may be used for the same reference sample. For example, at least one different one of a 3-tap filter, a 5-tap filter, a 7-tap filter, and an N-tap filter may be selected and applied according to at least one of an intra prediction mode, and the size and/or shape of the current block. Herein, N may be an integer.

Figure 21:
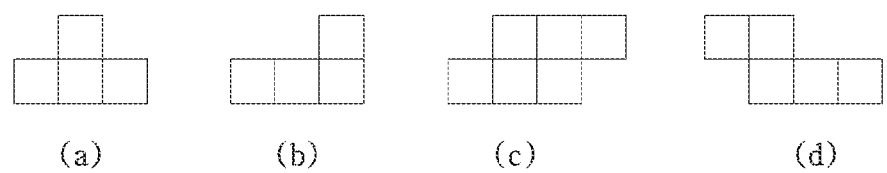
FIG. 21 is an exemplary view illustrating various two-dimensional filter shapes.

For example, a different filter shape may be selected and applied according to at least one of an intra prediction mode, and the size and/or shape of the current block. The filter shape may be one-dimensional or two-dimensional. FIG. 21 is an exemplary view illustrating various two-dimensional filter shapes.

The shape of the current block may be judged or determined by comparing the horizontal and vertical lengths of the current block. For example, in the cases where the horizontal length is larger than the vertical length, and the horizontal length is less than the vertical length, at least one of whether to apply filtering and/or a filter type may be applied differently. Or, whether to apply filtering and/or a filter type may be applied differently depending on whether the horizontal length and the vertical length are equal or different.

Now, a detailed description will be given of the step of performing intra prediction (S1230).

Intra prediction may be performed on the current block or sub-block based on the derived intra prediction mode and the reference samples. In the following detailed description, the current block may mean a sub-block.

For example, non-directional intra prediction may be performed as the intra prediction. The non-directional mode may be at least one of, for example, the DC mode and the Planar mode.

If the non-directional mode is the DC mode, intra prediction may be performed, using the mean value of one or more of the constructed reference samples. Herein, filtering may be applied to one or more prediction samples located at the boundary of the current block. The number of mean values may be 1 or larger, and prediction may be performed, using different mean values according to the positions of target samples for prediction. Different reference samples may be used according to at least one of the size or shape of the current block. For example, if the size of the block is larger than a predetermined size, one adjacent reference sample line may be used, and if the size of the block is less than the predetermined size, two adjacent reference sample lines may be used.

If the non-directional mode is the Planar mode, intra prediction may be performed, using a weighted sum calculated in consideration of distances from the constructed one or more reference samples, according to the position of a target sample for intra prediction in the current block.

As intra prediction, for example, directional intra prediction may be performed. The directional mode may be at least one of, for example, a horizontal mode, a vertical mode, and a mode having a predetermined angle.

If the directional mode is the horizontal and/or the vertical mode, intra prediction may be performed using at least one reference sample located on a horizontal and/or vertical line at the position of a target sample for intra prediction.

If the directional mode is a mode having a predetermined angle, intra prediction may be performed using one or more samples located on and adjacent to a line at a predetermined angle with respect to the position of a target sample for intra prediction. Herein, N reference samples may be used. N may be a positive integer such as 2, 3, 4, 5, and 6, and intra prediction may be performed by applying an N-tap filter such as 2-tap, 3-tap, 4-tap, 5-tap, and 6-tap filters. Herein, one or more reference sample lines may be used, and a different filter type may be applied to each reference sample line. Intra prediction may be performed by calculating a weighted mean of values obtained by applying a filter to each line. The number of reference sample lines used for the directional prediction may be different according to at least one of the directional mode, the size of the current block, and the shape of the current block.

Or intra prediction may be performed based on location information. The location information may be encoded/decoded, and a reconstructed sample block at the position may be derived as an intra prediction block for the current block. Or a block similar to the current block, searched for by a decoder may be derived as the intra prediction block of the current block.

Or, intra prediction may be performed based on a luma signal and/or a chroma signal. For example, intra prediction for a chroma signal may be performed using a reconstructed luma signal of the current block. For example, intra prediction for another chroma signal Cr may be performed using one reconstructed chroma signal Cb of the current block.

Intra prediction may be performed by using one or more of the afore-described various intra prediction methods in combination. For example, an intra prediction block may be constructed for the current block through a weighted sum of a block predicted using a predetermined non-directional intra prediction mode and a block predicted using a predetermined directional intra prediction mode. Herein, a different weight may be applied according to at least one of the intra prediction mode, block size, shape/and or sample position of the current block.

Or, regarding combined use of the one or more intra prediction modes, a prediction block may be constructed using a weighted sum of a value predicted using the intra prediction mode of the current block and a value predicted using a predetermined mode included in an MPM list.

Or, intra prediction may be performed using one or more reference sample sets. For example, intra prediction may be performed for the current block, using a weighted sum of a block intra-predicted using a reference sample obtained by not applying filtering to a constructed reference sample, and a block intra-predicted using a reference sample obtained by applying filtering to the constructed reference sample.

In the process of intra prediction, a filtering operation may be performed using a neighbor reconstructed sample. Herein, the filtering operation may or may not be performed according to at least one of the intra prediction mode, block size, shape, and/or sample position of the current block. The filtering operation may be included in the intra prediction process and thus performed as one step.

In performing intra prediction by dividing the current block into sub-blocks and deriving the intra prediction mode of each sub-block using the intra prediction mode of a neighbor block, filtering may be applied to each sub-block of the current block. For example, a low-pass filter may be applied to the entire current block. Or, a filer may be applied to a sample located on the boundary of each sub-block. Or a filter may be applied to the prediction block or reconstructed block of each sub-block, and one or more samples of a sub-block to which the filter is applied may be used in intra prediction of a subsequent sub-block.

In dividing the current block into sub-blocks and performing intra prediction for each sub-block, each sub-block may refer to at least one of a coding/decoding block, a prediction block, and a transform block. For example, if the current block is of size 64×64 and a sub-block is of size 16×16, the intra prediction mode of a prediction block being each sub-block may be derived and/or intra prediction may be performed for the prediction block. If each of the one or more sub-blocks is further divided into 8×8 or 4×4 blocks, each of the 8×8 or 4×4 blocks may be a transform block, and intra prediction may be performed for the blocks obtained by the further division using the intra prediction mode of the 16×16 block.

In the directional intra prediction, the current block may be encoded/decoded using at least one of N directional modes. Herein, N may be a positive integer such as 33 or 65.

FIG. 22 is a view depicting directional intra prediction modes and sample-wise directional intra prediction modes.

In the example illustrated in FIG. 22, N is 33, and for each intra prediction mode (preModeIntra), examples of an angle (intraPredAngle) between each directional mode and a vertical direction are illustrated.

In the directional intra prediction, the current block may be encoded/decoded in one or more of M sample-wise directional modes, M being a positive integer. A sample-wise directional mode may refer to a mode in which prediction is performed for every one or more target samples for prediction in the current block, using the one or more directional intra prediction modes.

Parameters for determining the number of sample-wise directional modes may be used. At least one of, for example, a curvature parameter (cuvN) and/or a weight parameter set (cWN[i], i=0, . . . , Ns−1) may be used as the parameters.

For example, in mode 35 of FIG. 22, various sample-wise directional prediction blocks may be generated in a direction from right uppermost to left lowermost by a combination of the two parameters. In mode 36 of FIG. 22, for example, various sample-wise directional prediction blocks may be generated in a direction from left uppermost to right lowermost by a combination of the two parameters. The curvature parameter and the weight parameter set are just an embodiment, and thus various parameters may be used to generate a sample-wise directional prediction block. For example, for different block sizes, look-up tables listing angles for detecting the positions of reference samples for sample-wise directional prediction at each sample position may be used commonly between the encoder and the decoder. Herein, index information for referring to a look-up table may be encoded/decoded.

In the directional intra prediction, the constructed reference sample may be reconstructed according to a directional prediction mode. For example, if the directional prediction mode is a mode in which all of left and upper reference samples are used, a one-directional array may be constructed with the left or upper reference samples.

Figure 23:
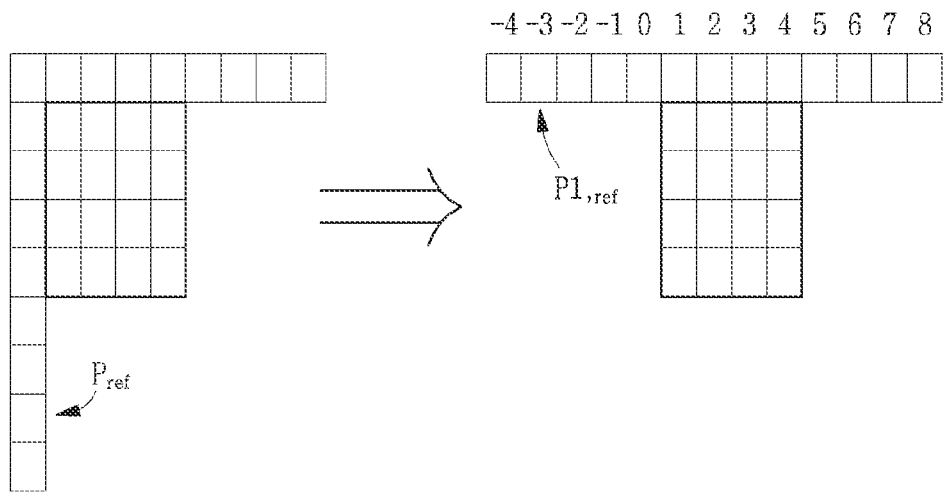
FIG. 23 is a view depicting an embodiment of generating a 1D reference sample array $p_{1,ref}$ from $P_{ref}$.

FIG. 23 is a view depicting an embodiment of generating a 1D reference sample array $p_{1,ref}$ from $P_{ref}$.

For example, as illustrated in FIG. 23, a 1D array of upper reference samples may be constructed using one or more of left reference samples. Different samples out of the left samples may be used to construct the upper reference samples according to the directional mode. The upper reference samples may be constructed by moving the left reference samples, or the upper reference samples may be constructed by using a weighted sum of one or more left reference samples.

In the directional intra prediction, real number-based interpolated prediction may be performed. For example, an offset (iIdx) and/or a weight (iFact) for prediction sample interpolation may be determined according to the position of a sample in the current block based on an angle parameter (intraPredAngle) corresponding to each directional prediction mode, as follows.

For example, on the assumption of interpolation in units of 1/32 pel, an offset and a weight for a directional mode having a vertical direction may be determined by the following [Equation 11].

$$iIdx=((y+1)*intraPredAngle)>>5$$

$$iFact=((y+1)*intraPredAngle)\&31 \qquad \text{[Equation 11]}$$

A different prediction sample value may be determined according to the value of iFact in [Equation 11]. For example, if iFact is not 0, a prediction position in a reference sample $P_{1,ref}$ is not an integer-based location (full sample location) but a real number-based location. Therefore, a prediction sample value at a target sample position (x, y) may be generated using a plurality of reference samples (e.g., two left and right adjacent reference samples) adjacent to a real-number position by the following [Equation 12]. Herein, the plurality of adjacent reference samples may be 4 or 6 left and right adjacent reference samples.

$$\text{predSample}[x][y]=((32-i\text{Fact})*p_{1,ref}[x+i\text{Idx}+1]+i\text{Fact}*p_{1,ref}[x+i\text{Idx}+2]+16)>>5 \quad [\text{Equation 12}]$$

For example, if iFact is 0, a prediction sample value may be generated by [Equation 13] below. Or, a 3-tap [1/4:2/4:1/4] filter may be applied using the reference sample $P_{1,ref}$ and left and right reference samples.

$$\text{predSamples}[x][y]=p_{1,ref}[x+i\text{Idx}+1] \quad [\text{Equation 13}]$$

In the case of at least one of the horizontal mode and/or the vertical mode among the directional prediction modes, filtering may not be performed for a reference sample. In addition, interpolated prediction may not be needed for the reference sample. Further, since prediction is possible only with upper or left reference samples, the process of constructing a 1D array for the reference sample may not be needed.

Figure 24:
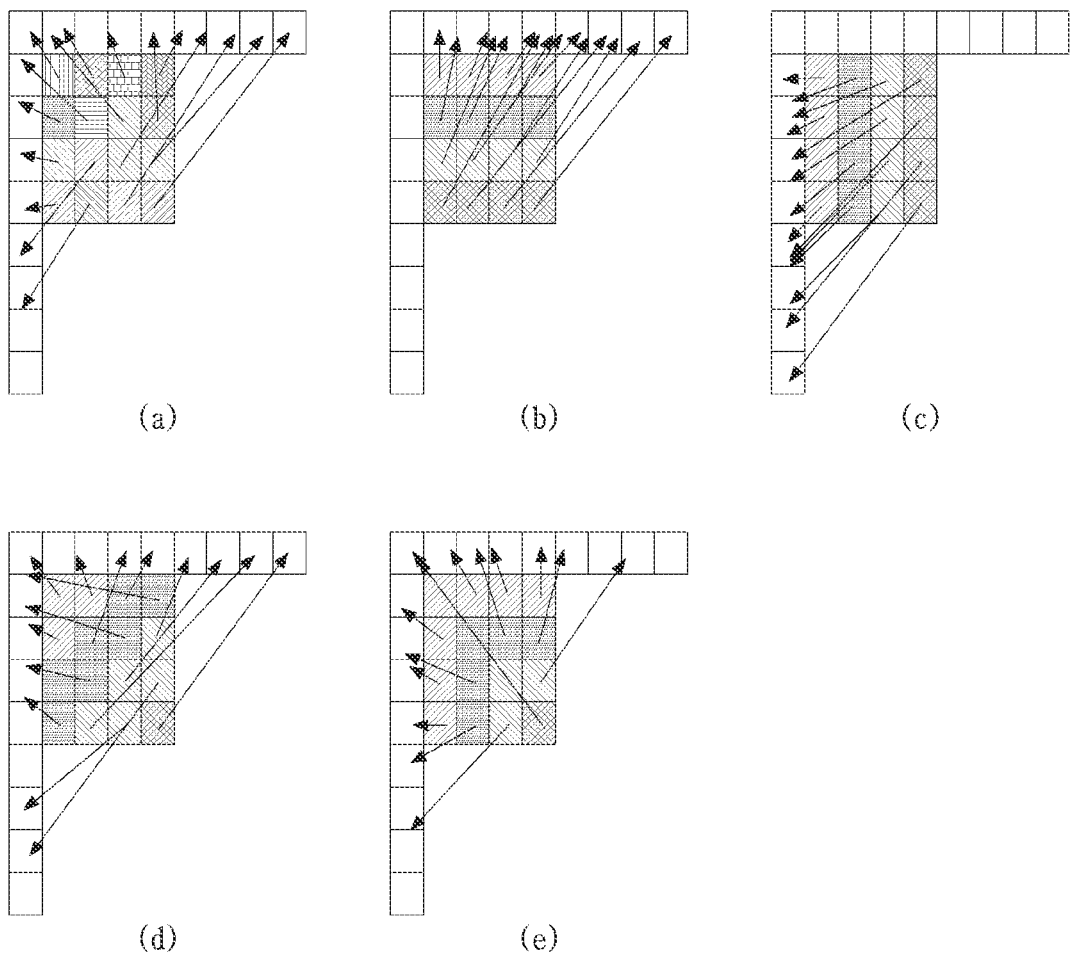
FIG. 24 is a view depicting an embodiment of using reference samples at different angles according to the positions of samples in a prediction block.

FIG. 24 is a view depicting an embodiment of using reference samples at different angles according to the positions of samples in a prediction block.

As illustrated in FIG. 24, a unit to which a directional mode may be changed in the directional intra prediction. That is, prediction may be performed using one or more directional modes on the basis of at least one of the units of a sample, a sample group, and a line in the target block.

For example, prediction may be performed using a directional mode on the basis of the current block. Or, prediction may be performed using a directional mode, for each target sample line for prediction in the current block. That is, prediction may be performed using a different directional mode for each of at least one line among the horizontal or vertical lines of the current block. Or, prediction may be performed using a directional mode, for each predetermined target sample group for prediction in the current block. That is, prediction may be performed using a different directional mode for each group including N samples in the current block. For example, prediction may be performed using a directional mode for each target sample for prediction in the current block. That is, prediction may be performed using a different directional mode for each target sample for prediction in the current block.

(a) of FIG. 24 illustrates an exemplary case in which a different directional mode is used for each sample in a target block. In the example illustrated in (a) of FIG. 24, a prediction value may be generated for each sample, using a reference sample located at the angle of each directional mode.

(b) of FIG. 24 illustrates an exemplary case in which a different directional mode is used for each horizontal line in a target block. In the example illustrated in (b) of FIG. 24, prediction values may be generated for each horizontal line, using reference samples located at the angle of each directional mode.

(c) of FIG. 24 illustrates an exemplary case in which a different directional mode is used for each vertical line in a target block. In the example illustrated in (c) of FIG. 24, prediction values may be generated for each vertical line, using reference samples located at the angle of each directional mode.

(d) of FIG. 24 illustrates an exemplary case in which a different directional mode is used for each sample group in a diagonal line direction in a target block. In the example illustrated in (d) of FIG. 24, prediction values may be generated for each diagonal sample group in a diagonal line direction, using reference samples located at the angle of each directional mode.

(e) of FIG. 24 illustrates an exemplary case in which a different directional mode is used for each L-shaped line in a target block. In the example illustrated in (e) of FIG. 24, prediction values may be generated for each right-angled line, using reference samples located at the angle of each directional mode.

Aside from the examples of FIG. 24, various methods for groping one or more samples may be available. For example, a different directional mode may be applied to each block generated by dividing a latitude and/or a longitude by an arbitrary number.

If the sample-wise directional prediction is performed, N (N is a positive integer) directional prediction modes or angles available for at least one of the units of a sample, a sample group, and a line may be stored in a table such as an LUT and then used.

If the sample-wise directional prediction is performed, a different scanning method may be applied in scanning the transform coefficients of a residual block for a target block, according to at least one of the type of the sample-wise directional prediction, a block size, and/or a block shape. For example, scanning may be performed using at least one of upright scanning, vertical scanning, horizontal scanning, and zigzag scanning according to the type of the sample-wise directional prediction.

Now, a description will be given of intra prediction on chroma component. For example, inter-color component intra prediction may be performed for intra prediction on chroma component. Or, intra chroma prediction may be performed using a reconstructed luma component of the current block. Or intra prediction for another chroma component Cr may be performed using one reconstructed chroma component Cb of the current block.

In the inter-color intra prediction, a color component may refer to at least one of a luma signal, a chroma signal, Red, Green, Blue, Y, Cb, and Cr. In prediction of a first color component, at least one of second, third, and fourth color components may be used. Herein, a color component signal used in prediction may be at least one of an original signal, a reconstructed signal, a residual signal, and a prediction signal.

For example, in prediction of a second color component target block, intra prediction may be performed using at least one of a sample of a first color component corresponding block corresponding to the target block and/or a sample of a neighbor block of the corresponding block.

For example, in prediction of a chroma component block Cb or Cr, intra prediction may be performed using a reconstructed luma component block Y corresponding to the chroma component block.

For example, in prediction of a second chroma component block, a first chroma component block corresponding to the block may be used. For example, the Cb component block may be used in prediction of the Cr component block.

For example, at least one of first, second, and third color component blocks may be used in combination in predicting a fourth color component block.

It may be determined whether to perform inter-color intra prediction, based on at least one of the size and shape of a current target block.

For example, if the size of the target block is equal to a predetermined size, is equal to or greater than the predetermined size, or corresponds to a predetermined size range, the inter-color intra prediction may be performed. The predetermined size may be, for example, a CTU size.

For example, if the shape of the target block corresponds to a predetermined shape, the inter-color intra prediction may be performed. For example, if the shape of the target block is a square, the inter-color intra prediction may be performed. Or, if the shape of the target block is a rectangle, the inter-color intra prediction may not be performed.

It may be determined whether to perform inter-color intra prediction, according to a coding parameter of at least one of a corresponding block corresponding to a target block for prediction and a neighbor block of the corresponding block.

For example, if the coding mode of the corresponding block is an inter mode, the inter-color intra prediction may not be performed. Or, in prediction of a second color component target block in a CIP (constrained intra prediction) environment, if a corresponding first color component block is encoded in an inter mode, the inter-color intra prediction may not be performed.

For example, if the coding mode of the corresponding block is an inter mode, the inter-color intra prediction may be performed. Herein, a flag indicating whether the inter-color intra prediction is performed may be signaled. According to the flag, inter prediction or inter-color intra prediction may be performed for a target block for prediction.

For example, if the intra prediction mode of the corresponding block corresponds to a predetermined mode, inter-color intra prediction may be performed.

For example, it may be determined whether to perform the inter-color intra prediction according to CBF information about at least one of the corresponding block and a neighbor block.

In predicting the second color component using the first color component, the size of the first color component block may be reconfigured in order to make the size of the first or second color component block equal. For example, if the color space of an image is YCbCr and a ratio among color components is one of 4:4:4, 4:2:2, and 4:2:0, block sizes may be different for the color components, and a block may be reconstructed to make the block sizes equal. Herein, the reconstructed block may include at least one of a sample of a first color component corresponding block and a reference sample of a neighbor block.

For example, if the first color component block and the second color component block are equal in size, the reconstruction process may not be performed.

For example, if the size of the first color component block is larger than the size of the second color component block, the size of the first color component block may become equal to the size of the second color component block by down-sampling the first color component block.

For example, if the size of the first color component block is less than the size of the second color component block, the size of the first color component block may become equal to the size of the second color component block by up-sampling the first color component block.

In the reconstruction process, a filter may be applied to one or more samples. For example, a filter may be applied to one or more samples included in at least one of the first color component corresponding block, a neighbor block of the corresponding block, the second color component target block, and a neighbor block of the target block.

In the reference sample construction step, an indicator corresponding to a predetermined line among a plurality of lines of reference samples may be signaled, and reconstruction may be performed using the predetermined line corresponding to the signaled indicator in the reconstruction step.

In the reconstruction process, if at least one of the boundary of the second color component prediction target block or the boundary of the first color component corresponding block corresponding to the second color component prediction target block corresponds to the boundary of at least one of a picture, a slice, a tile, a CTU, and a CU, a different reconstructed reference sample may be selected and used. Herein, the number of upper reference sample lines may be different from the number of left reference sample lines.

For example, if the upper boundary of the first color component corresponding block corresponds to one of the above boundaries, reconstruction may be performed using only left reference samples, without using upper reference samples. Or only one line f upper reference samples may be used.

For example, if the left boundary of the first color component corresponding block corresponds to one of the above boundaries, reconstruction may be performed using only upper reference samples, without using left reference samples.

FIG. 25 is a view depicting an embodiment of reconstructing a corresponding block using an upper and/or left reference sample line.

For example, reconstruction may be performed N or M upper or left reference sample lines of the first color component corresponding block irrespective of boundary matching. For example, as illustrated in (a) of FIG. 25, reconstruction may be performed using four upper reference sample lines and four left reference sample lines.

For example, if the upper or left boundary of the first color component corresponding block corresponds to one of the above boundaries, the number of used upper reference sample lines may be different from the number of used left reference sample lines. For example, as illustrated in (b) of FIG. 25, reconstruction may be performed using two upper reference sample lines and four left reference sample lines of the first color component corresponding block. Or, as illustrated in (c) of FIG. 25, reconstruction may be performed using one upper reference sample line and two left reference sample lines of the first color component corresponding block.

In the reconstruction process, the horizontal and vertical lengths of reference samples of the first color component may not be outside of the horizontal and vertical lengths of the first color component corresponding block. For example, as illustrated in (d) of FIG. 25, reconstruction may be performed using one or more reference samples which are not outside of the horizontal and vertical lengths of the first color component corresponding block.

In the reconstruction process, reference samples of the first color component may be reconstructed in a difference manner according to at least one of the size, shape, and coding parameter of at least one of the first color component corresponding block, a neighbor block of the first color component corresponding block, the second color component target block, and a neighbor block of the second color component target block.

For example, for the first color component corresponding block or the neighbor block, reference samples may be reconstructed using samples of a block whose mode is an intra coding mode, without using samples of a block whose coding mode is an inter-coding mode.

For example, reference samples of the first color component may be reconstructed in a different manner according to the intra prediction mode of the first color component corresponding block.

For example, the reference samples of the first color component may be reconstructed in a different manner according to a quantization parameter of at least one of the first color component corresponding block or the neighbor block.

For example, if the second color component corresponding block is shaped into a rectangle, reconstruction may be performed using reference samples adjacent to a square into which the first color component corresponding block is shaped.

One or more prediction parameters may be derived using at least one of the reconstructed reference samples of the first color component corresponding block and the reconstructed reference samples of the second color component corresponding block. Hereinbelow, the first color component and the first color component block may refer to the reconstructed first color component and the reconstructed first color component block, respectively.

Figure 26:
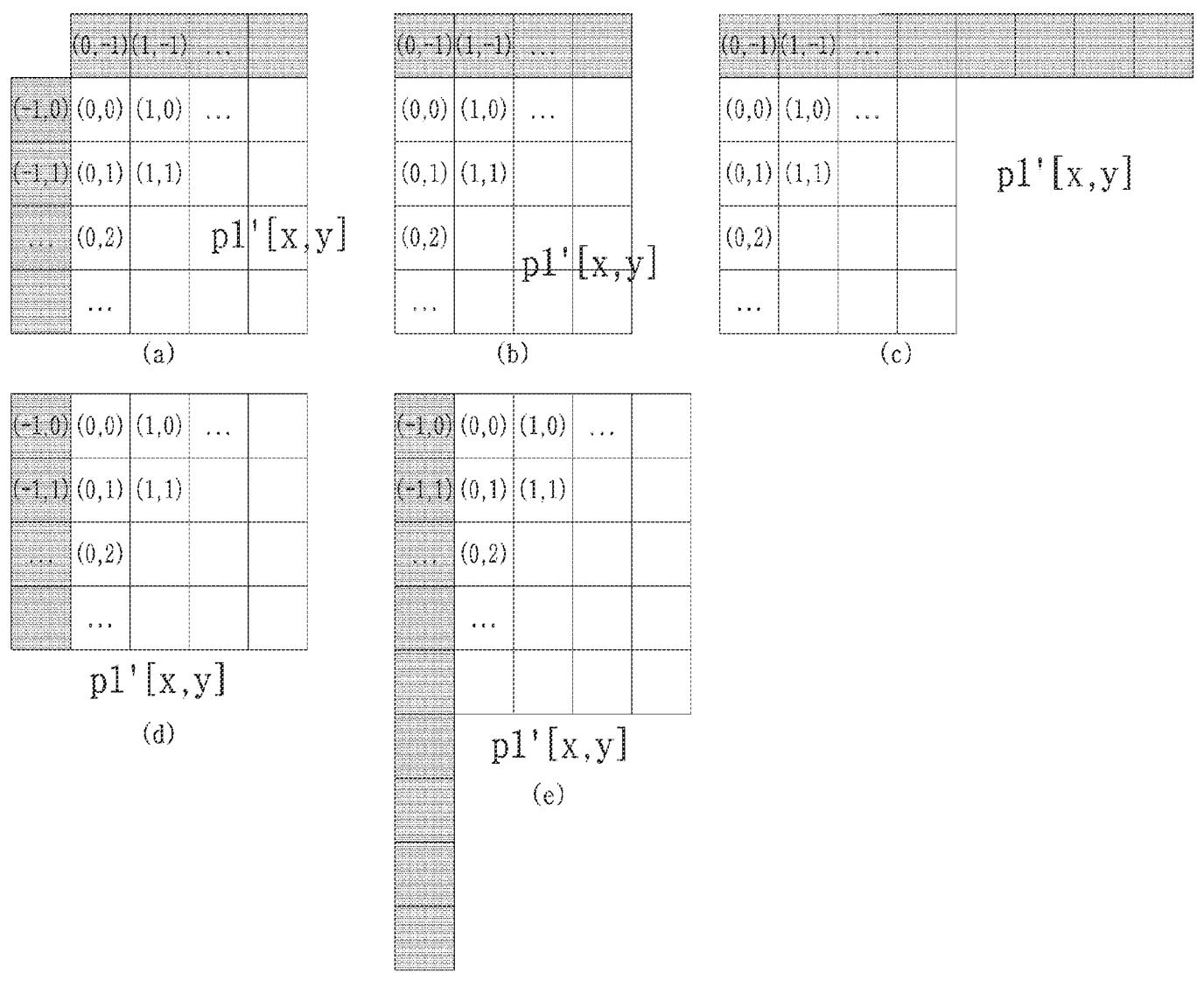

FIG. 26 is a view depicting an embodiment of a reconstructed first color component corresponding block, in the case where a second color component prediction target block is of size 4×4. Herein, the number of reference sample lines may be N, and N may be 0 or an integer equal to or larger than 1.

As illustrated in (a) of FIG. 26, a prediction parameter may be derived using upper and left reference samples of a reconstructed first color component block or second color component block. For example, a prediction parameter may be derived by adaptively using the reference samples of the first color component reconstructed based on the intra prediction mode of the first color component corresponding block. Herein, the reference samples of the second color component may also be used adaptively based on the intra prediction mode of the first color component corresponding block.

For example, if the intra prediction mode is a non-directional mode such as the DC mode or the Planar mode, upper and left reference samples of the first color component corresponding block may be used, as illustrated in (a) of FIG. 26.

For example, if the intra prediction mode is a directional mode using all of upper and left reference samples, upper and left reference samples of the first color component corresponding block may be used, as illustrated in (a) of FIG. 26.

For example, if the intra prediction mode is a directional mode using upper reference samples, upper reference samples of the first color component corresponding block may be used, as illustrated in (b) or (c) of FIG. 26.

For example, if the intra prediction mode is a directional mode using left reference samples, left reference samples of the first color component corresponding block may be used, as illustrated in (d) or (e) of FIG. 26.

For example, a prediction parameter may be derived by adaptively using reference samples of the first color component or the second color component according to at least one of the size or shape of the first color component block or the second color component block.

For example, if the size of the second color component target block corresponds to a predetermined size, the reference samples of the first or second color component block may be used adaptively. For example, if the size of the second color component target block is 64×64, as many reference samples as at least one of 32, 16, and 8 among the upper or left reference samples of the first or the second color component block may be used.

For example, if the second color component target block is shaped into a rectangle, reference samples adjacent to the longer between the latitude and longitude of the rectangle. For example, if the shape of the target block is 32×8, upper reference samples of the first or second color component block may be used.

For example, if the second color component target block is shaped into a rectangle, reference samples of a square block may be used. For example, if the shape of the target block is 32×8, reference samples neighboring to a 32×32 block may be used.

A prediction parameter may be derived and inter-color prediction may be performed, using a reference sample of the reconstructed first color component block and a reference sample of the second color component block. For example, a prediction parameter may be derived based on at least one of a correlation, variation, mean value, and distribution between reference samples of the color components, and may be derived using at least one of, for example, methods such as LS (Least Square) and LMS (Least Mean Square).

For example, prediction parameters may be derived using the LMS method. Herein, the prediction parameters may be at least one of a and b, or alpha and beta. For example, a prediction parameter that minimizes an error between a first color component reference sample and a second color component reference sample may be derived by [Equation 14] below. In [Equation 14], $p2_n$ may represent a reference sample of the second color component, and $p1'_n$ may represent a reconstructed reference sample of the first color component. In addition, N may represent the number of used horizontal or vertical reference samples, and a and b may represent prediction parameters.

$$E(a, b) = \sum_{n=0}^{N-1} (p2_n - (a \cdot p1'_n + b))^2 \qquad \text{[Equation 14]}$$

A correlation between reference samples may be calculated by [Equation 15]. In [Equation 15], BitDepth may represent a bit depth.

$$k = \text{Max}(0, BitDepth + \log2(N) - 15) \qquad \text{[Equation 15]}$$

$$L = \left( \sum_{y=0}^{N-1} p1'[-1, y] + \sum_{x=0}^{N-1} p1'[x, -1] \right) \gg k$$

$$C = \left( \sum_{y=0}^{N-1} p2[-1, y] + \sum_{x=0}^{N-1} p2[x, -1] \right) \gg k$$

$$LL = \left( \sum_{y=0}^{N-1} p1'[-1, y]2 + \sum_{x=0}^{N-1} p1'[x, -1]2 \right) \gg k$$

$$LC = \left( \sum_{y=0}^{N-1} p1'[-1, y] \times p2[-1, y] + \sum_{x=0}^{N-1} p1'[x, -1] \times p2[x, -1] \right) \gg k$$

Figure 27:
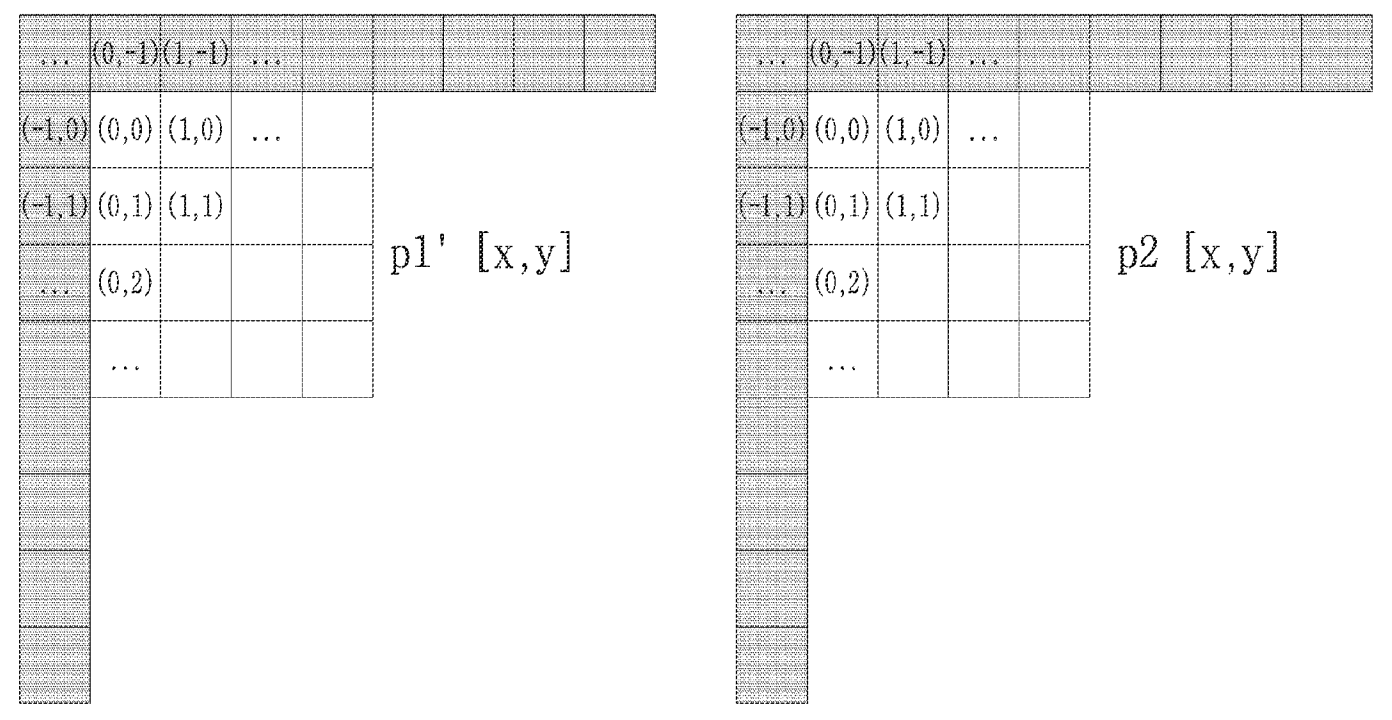

FIG. 27 is an exemplary view depicting samples of a first color component, and samples of a second color component. In FIG. 27, p2 may represent samples of the second color component, and p1' may represent reconstructed samples of the first color component.

For example, in the presence of an area without reference samples, prediction parameters may be derived using only existing reference samples.

Or default prediction parameters may be used, without deriving prediction parameters from the reference samples. The default prediction parameters may be predefined, and for example, a may be 1 and b may be 0. Or the derived prediction parameters may be encoded/decoded.

For example, in inter-color prediction between Y, Cb, and Cr, prediction parameters for predicting Cb and Cr may be derived respectively from Y. Or prediction parameters for predicting Cr may be derived from Cb. Or without deriving prediction parameters for predicting Cr, prediction parameters derived from Y to predict Cb may be used.

One or more prediction parameters may be derived. For example, one prediction parameter may be derived from reference samples which are used to derive the prediction parameters, and whose values satisfy a predetermined condition. Further, another prediction parameter may be derived from reference samples which do not satisfy the predetermined condition.

The prediction parameters may be derived from prediction parameters of one or more blocks neighboring to a target block for prediction. For example, if the neighbor blocks are encoded by inter-color prediction, a prediction parameter used for the inter-color prediction may be used as a prediction parameter of the target block for prediction. Herein, at least one of whether a neighboring prediction parameter has been used, location information about a neighbor block, and a prediction parameter index may be signaled.

Inter-color intra prediction may be performed using at least one of the derived prediction parameters. For example, prediction may be performed for the second color component target block by applying the derived prediction parameters to a reconstructed signal of the reconstructed first color component by [Equation 16].

$$p2[x, y] = a \times p1'[x, y] + b \quad \text{[Equation 16]}$$

Or, prediction may be performed for the second color component target block by applying the derived prediction parameters to a residual signal of the reconstructed first color component by [Equation 17].

$$p2[x,y] = p2\_pred[x, y] + a \times p1'\_residual[x, y] \quad \text{[Equation 17]}$$

In [Equation 17], a may represent the derived prediction parameter, and p1_residual may represent the residual signal of the first color component. In addition, p2_pred may represent a signal obtained by predicting the second color component target block using at least one of a non-directional intra prediction mode or a directional intra prediction mode.

If one or more prediction parameters are derived, the one or more prediction parameters may be applied to the reconstructed samples of the first color component. For example, if the reconstructed samples of the first component satisfy a predetermined condition, inter-color intra prediction may be performed by applying a prediction parameter derived from the samples satisfying the predetermined condition. Or, if the reconstructed samples of the first component do not satisfy the predetermined condition, inter-color intra prediction may be performed by applying a prediction parameter derived from the samples which do not satisfy the predetermined condition.

The intra encoding/decoding process may be performed for each of luma and chroma signals. For example, in the intra encoding/decoding process, at least one method of deriving an intra prediction mode, dividing a block, constructing reference samples and performing intra prediction may be differently applied for a luma signal and a chroma signal.

The intra encoding/decoding process may be equally performed for luma and chroma signals. For example, at least one of deriving an intra prediction mode, dividing a block, constructing reference samples and performing intra prediction in the intra encoding/decoding process applied to the luma signal may be equally applied to the chroma signal.

The methods may be performed in the encoder and the decoder in the same manner. For example, in the intra encoding/decoding process, at least one method of deriving an intra prediction mode, dividing a block, constructing reference samples and performing intra prediction may be applied in the encoder and the decoder equally. In addition, orders of applying the methods may be different in the encoder and the decoder. For example, in performing intra encoding/decoding for the current block, an encoder may encode an intra prediction mode determined by performing at least one intra prediction after constructing reference samples.

The embodiments of the present invention may be applied according to the size of at least one of a coding block, a prediction block, a block, and a unit. Here, the size may be defined as the minimum size and/or the maximum size in order to apply the embodiments, and may be defined as a fixed size to which the embodiment is applied. In addition, a first embodiment may be applied in a first size, and a second embodiment may be applied in a second size. That is, the embodiments may be multiply applied according to the size. In addition, the embodiments of the present invention may be applied only when the size is equal to or greater than the minimum size and is equal to or less than the maximum size. That is, the embodiments may be applied only when the block size is in a predetermined range.

For example, only when the size of the encoding/decoding target block is equal to or greater than 8×8, the embodiments may be applied. For example, only when the size of the encoding/decoding target block is equal to or greater than 16×16, the embodiments may be applied. For example, only when the size of the encoding/decoding target block is equal to or greater than 32×32, the embodiments may be applied. For example, only when the size of the encoding/decoding target block is equal to or greater than 64×64, the embodiments may be applied. For example, only when the size of the encoding/decoding target block is equal to or greater than 128×128, the embodiments may be applied. For example, only when the size of the encoding/decoding target block is 4×4, the embodiments may be applied. For example, only when the size of the encoding/decoding target block is equal to or less than 8×8, the embodiments may be applied. For example, only when the size of the encoding/decoding target block is equal to or less than 16×16, the embodiments may be applied. For example, only when the size of the encoding/decoding target block is equal to or greater than 8×8 and is equal to or less than 16×16, the embodiments may be applied. For example, only when the size of the encoding/decoding target block is equal to or greater than 16×16 and is equal to or less than 64×64, the embodiments may be applied.

The embodiments of the present invention may be applied according to a temporal layer. An identifier for identifying the temporal layer to which the embodiment can be applied may be signaled, and the embodiments may be applied for the temporal layer specified by the identifier. Here, the identifier may be defined as indicating the minimum layer and/or the maximum layer to which the embodiment can be applied, and may be defined as indicating a particular layer to which the embodiment can be applied.

For example, only when the temporal layer of the current picture is the lowest layer, the embodiments may be applied. For example, only when a temporal layer identifier of the current picture is zero, the embodiments may be applied. For example, only when the temporal layer identifier of the current picture is equal to or greater than one, the embodiments may be applied. For example, only when the temporal layer of the current picture is the highest layer, the embodiments may be applied.

As described in the embodiment of the present invention, a reference picture set used in processes of reference picture list construction and reference picture list modification may use at least one of reference picture lists L0, L1, L2, and L3.

According to the embodiments of the present invention, when a deblocking filter calculates boundary strength, at least one to at most N motion vectors of the encoding/decoding target block may be used. Here, N indicates a positive integer equal to or greater than 1 such as 2, 3, 4, etc.

In motion vector prediction, when the motion vector has at least one of a 16-pixel (16-pel) unit, a 8-pixel (8-pel) unit, a 4-pixel (4-pel) unit, an integer-pixel (integer-pel) unit, a 1/2-pixel (1/2-pel) unit, a 1/4-pixel (1/4-pel) unit, a 1/8-pixel (1/8-pel) unit, a 1/16-pixel (1/16-pel) unit, a 1/32-pixel (1/32-pel) unit, and a 1/64-pixel (1/64-pel) unit, the embodiments of the present invention may be applied. In addition, in performing motion vector prediction, the motion vector may be optionally used for each pixel unit.

A slice type to which the embodiments of the present invention may be defined and the embodiments of the present invention may be applied according to the slice type.

For example, when the slice type is a T (Tri-predictive)-slice, a prediction block may be generated by using at least three motion vectors, and may be used as the final prediction block of the encoding/decoding target block by calculating a weighted sum of at least three prediction blocks. For example, when the slice type is a Q (Quad-predictive)-slice, a prediction block may be generated by using at least four motion vectors, and may be used as the final prediction block of the encoding/decoding target block by calculating a weighted sum of at least four prediction blocks.

The embodiment of the present invention may be applied to inter prediction and motion compensation methods using motion vector prediction as well as inter prediction and motion compensation methods using a skip mode, a merge mode, etc.

The shape of the block to which the embodiments of the present invention is applied may have a square shape or a non-square shape.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:

1. A video decoding method comprising:
   determining whether a current coding block is intra-predicted;
   obtaining sub-block division information indicating whether the current coding block is divided into a plurality of sub-blocks in response to the current coding block, being intra-predicted and a size of the current coding block being within a predetermined range;
   deriving, an MPM list for the current coding block based on one or more intra prediction modes from neighboring blocks of the current coding block; and
   when the sub-block division information indicates that the current coding block is divided into the plurality of sub-blocks, dividing the current coding block into a plurality of sub-blocks and generating a prediction block for each of the plurality of sub-blocks according to an intra prediction mode derived based on the MPM list for the current coding block, and wherein the plurality of sub-blocks are generated by dividing the current coding block vertically or horizontally, and wherein the prediction block for each of the plurality of sub-blocks are generated by the infra prediction mode derived based on the MPM list of the current coding block.

2. The video decoding method of claim 1, wherein a number of the plurality of sub-blocks is determined to be 2 or 4 according to the size of the current coding block.

3. The video decoding method of claim 1, further comprising:

obtaining division information indicating a division structure of the current coding block, when the sub-block division information indicates that the current coding block is divided into the plurality of sub-blocks, and wherein the current coding block is divided based on the division information.

4. The video decoding method of claim 1, wherein whether to divide the current coding block is determined based on a color component of the current coding block.

5. A video encoding method comprising:

determining whether a current coding block is intra-predicted;

encoding sub-block division information indicating whether the current coding block is divided into a plurality of sub-blocks in response to the current coding block being intra-predicted and a size of the current coding block being within a predetermined range;

deriving an MPM list for the current coding block based on one or more intra prediction modes from neighboring blocks of the current coding block; and when the current coding block is determined to be divided into the plurality of sub-blocks, dividing the current coding block into a plurality of sub-blocks and generating a prediction block for each of the plurality of sub-blocks according to an intra prediction mode encoded based on the MPM list for the current coding block, and wherein the plurality of sub-blocks are generated by dividing the current coding block vertically or horizontally, and wherein the prediction Nock for each of the plurality of sub-blocks are generates by the intra prediction mode encoded based on the MPM list of the current coding block.

6. The video encoding method of claim 5, wherein a number of the plurality of sub-blocks is determined to be 2 or 4 according to the size of the current block.

7. The video encoding method of claim 5, further comprising:

encoding division information indicating a division structure of the current coding block, when the sub-block division information indicates that the current coding block is divided into the plurality of sub-blocks, and wherein the current coding block is divided based on the division information.

8. The video encoding method of claim 5, wherein whether to divide the current coding block is determined based on a color component of the current coding block.

9. A non-transitory computer-readable recording medium storing a bitstream decoded by an image decoding method, the image decoding method comprising:

obtaining sub-block division information indicating whether the current coding block is divided into a plurality of sub-blocks in response to the current coding block being intra-predicted and a size of the current coding block being within a predetermined range;

deriving an MPM list for the current coding block based on one or more intra prediction modes from neighboring blocks of the current coding block; and when the sub-block division information indicates that the current coding block is divided into the plurality of sub-blocks, dividing the current coding block into a plurality of sub-blocks and generating a prediction block for each of the plurality of sub-blocks according to an intra prediction mode derived based on the MPM list for the current coding block, and wherein the plurality of sub-blocks are generated by dividing the current coding block vertically or horizontally, and wherein the prediction block for each of the plurality of sub-blocks are generated by the infra prediction mode derived based on the MPM list of the current coding block.

* * * * *